United States Patent [19]
Collins et al.

[11] Patent Number: 5,855,483
[45] Date of Patent: Jan. 5, 1999

[54] INTERACTIVE PLAY WITH A COMPUTER

[75] Inventors: Roger Collins, Novato; Tony Robinson, Palo Alto; Yolanda Jenkins, Oakland; Karla DiGrazia, Burlingame; Stuart Ozer; Bryan Freedman, both of San Francisco; Maurice Voce, San Carlos; Jane Devon, Daly City; Chris Briggs, Santa Cruz, all of Calif.

[73] Assignee: Compaq Computer Corp., Houston, Tex.

[21] Appl. No.: 812,917

[22] Filed: Mar. 10, 1997

Related U.S. Application Data

[63] Continuation of Ser. No. 342,709, Nov. 21, 1994, abandoned.

[51] Int. Cl.[6] .............................. G09B 3/00; G09B 5/00
[52] U.S. Cl. ........................................ 434/322; 434/307 R
[58] Field of Search .................................... 273/460, 461; 434/62, 63, 307 R, 322; 345/156, 161, 168, 169, 173

[56] References Cited

U.S. PATENT DOCUMENTS

| | | | |
|---|---|---|---|
| 4,159,417 | 6/1979 | Rubincam | 235/375 |
| 4,767,334 | 8/1988 | Thorne et al. | 434/29 |
| 4,846,693 | 7/1989 | Baer | 434/308 |
| 4,855,725 | 8/1989 | Fernandez | 345/173 |
| 4,887,966 | 12/1989 | Gellerman | 434/45 |
| 5,120,065 | 6/1992 | Driscoll et al. | 273/237 |
| 5,402,518 | 3/1995 | Lowery | 395/2.1 |
| 5,450,079 | 9/1995 | Dunaway | 341/23 |
| 5,670,992 | 9/1997 | Yasuhara et al. | 345/173 |

FOREIGN PATENT DOCUMENTS

| | | | |
|---|---|---|---|
| A 0281427 | 9/1988 | European Pat. Off. | A53H 30/04 |
| 0583908 | 8/1993 | European Pat. Off. | G06F 15/64 |
| 4204241 | 8/1993 | Germany | G06F 3/02 |
| A 59-228473 | 12/1984 | Japan | H04N 5/26 |
| 2244896 | 12/1991 | United Kingdom | G06F 15/44 |
| WO 92/11731 | 7/1992 | WIPO | H04N 1/46 |
| WO 93/08654 | 4/1993 | WIPO | H04B 10/00 |

OTHER PUBLICATIONS

JC Penney Catalog — Christmas 1993, p. 486, Item F. (V Tech Little Smart Driver), 1993.

"Playthings", Feb. 1994, New York, vol. 92, No. 2 [Different information listed in Search Report].

Comfy Keyboard Manual excerpt, undated.

Virtual Guitar Brochure, copyright Ahead, Inc., 1993.

JC Penney Catalog — Christmas 1993, p. 486, Item F. (V–Tech Little Smart Driver).

*Primary Examiner*—Robert A. Hafer
*Assistant Examiner*—John Edmund Roynak
*Attorney, Agent, or Firm*—Jenkens & Gilchrist

[57] ABSTRACT

An interactive apparatus for use with a computer, comprising a transceiver for two-way wireless communication with a plaything, the transceiver having terminals for connection to the computer, and a control device for causing the computer to send and receive information to and from the plaything via the transceiver to enable the plaything to provide interactive fantasy simulation of the behavior of a corresponding real-world object. In another aspect, the invention provides a method for enabling fantasy play using a computer and a plaything, comprising at the plaything, delivering output and receiving input associated with the fantasy play, and generating control signals at the computer for controlling the output based on the input, and by wireless communication sending the control signals from the computer to the plaything and sending the input from the plaything to the computer.

13 Claims, 26 Drawing Sheets

(TOY – DETAILS)

TRANSCEIVER DATA PROTOCOL

"PHOTOWORKS"
BLOCK DIAGRAM

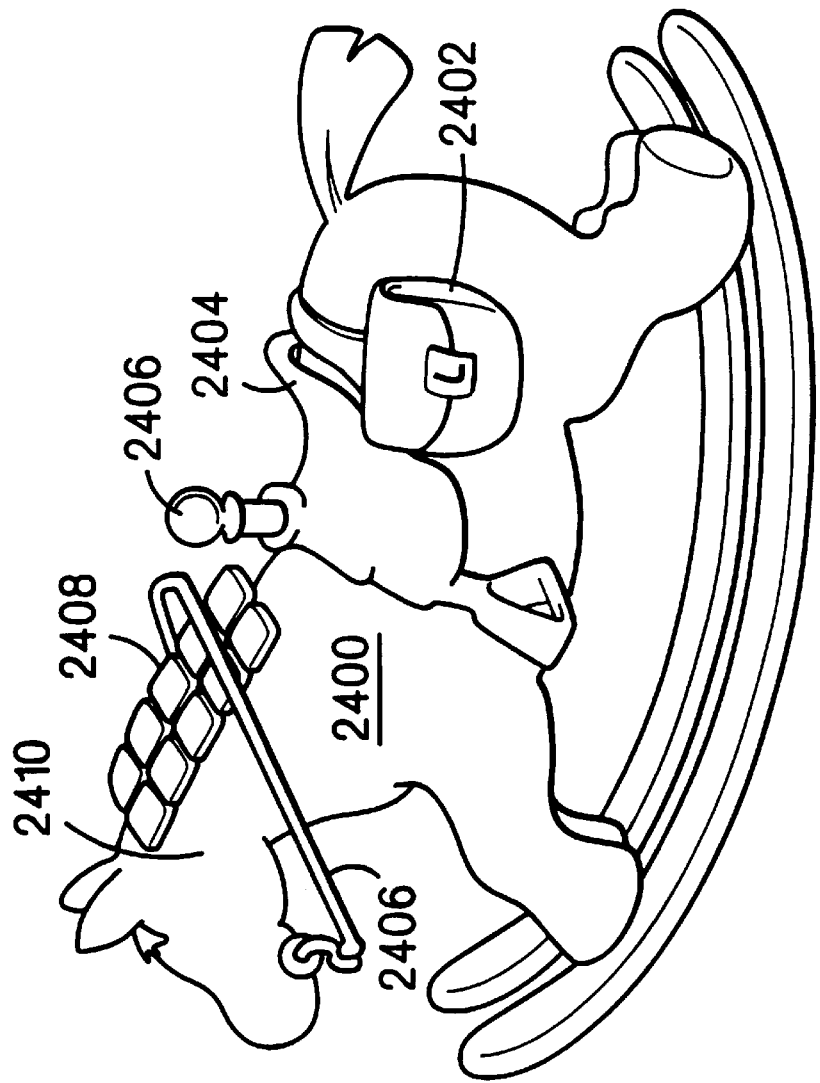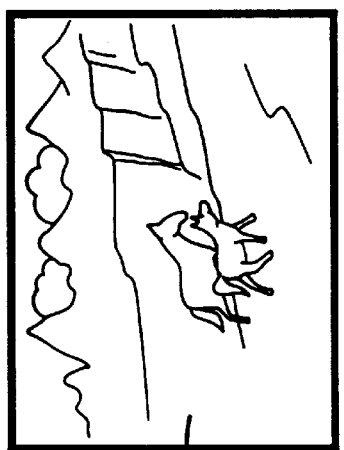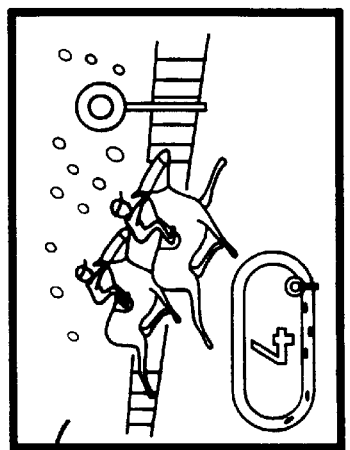
FIG. 24 ns and a correspondingsion, receives input,al response.g to use personal computers for

INTERACTIVE PLAY WITH A COMPUTER

This is a continuation of application Ser. No. 08/342,709, filed Nov. 21, 1994, now abandoned.

BACKGROUND

This invention relates to interactive play with a computer.

Children, for example, use a variety of playthings for entertainment, fantasy play, and education. Some playthings, such as plush toys, can serve as companions, playmates, or characters in a game. Other playthings, such as busy boxes, have pushbuttons, horns, lights, and switches. When a child pushes the buttons or switches, enjoyable sounds or light displays are generated. Some busy boxes simulate the controls of a real-world object, such as an automobile dashboard or aircraft cockpit; others simulate a real-world environment, such as a farm, city, or shopping center.

Some electronic toys for entertainment and education are equipped with microprocessors, stored control programs in read-only memories (ROMs), specialized sound or speech processors, keyboards or other input devices, small display devices, lights, and loudspeakers. The control program typically prompts a user to respond in a way intended to achieve a specific educational or entertainment goal, receives input, and gives a corresponding audiovisual response.

Children are also beginning to use personal computers for education and entertainment, using software to teach reading, spelling, and mathematics.

Adults are also known to use interactive playthings.

SUMMARY

In general, in one aspect, the invention features an interactive apparatus for use with a computer, comprising a transceiver for two-way wireless communication with a plaything, the transceiver having terminals for connection to the computer, and a control device for causing the computer to send and receive information to and from the plaything via the transceiver to enable the plaything to provide interactive fantasy simulation of the behavior of a corresponding real-world object.

Implementations of the invention may include the following features. The control device may comprise a set of computer instructions. The transceiver may have a connector for attachment to a communications port of the computer.

In general, in another aspect, the invention features an interactive apparatus for use with a computer, comprising a transmitter for wireless communication to a plaything, the transmitter having terminals for connection to the computer, and a control device for retrieving from the computer and sending, via the transmitter to the plaything, synthesized voiced utterances for playback at the plaything.

In another aspect, the invention features an interactive apparatus for use with a computer, comprising a receiver for wireless reception of information transmitted from a plaything, the receiver having terminals for connection to the computer, and a control device for controlling the performance of multimedia material on the computer in response to the information received from the plaything.

In another aspect, the invention features a plaything comprising visual and tactile elements that simulate a real-world object and impart a fantastic aura to the plaything to enable fantasy play, an input device for receiving input from a user of the plaything, an output device that provides controlled output to the user to aid in the fantasy play, and a transceiver connected to the input and output devices, for two-way wireless communication with a computer. Implementations of the invention may include the following features. The visual and tactile elements comprise elements of a driver simulator, a camera, a control panel, or a portable computer. The visual and tactile elements may also comprise a mat having a plurality of spaces, each space having a sensor associated with the space for communicating occupancy of the space to the computer. The visual and tactile elements may comprise elements of a picnic with animal characters, scientific equipment, a desk, a simulated circus, a rocking horse, a puzzle, medical equipment, or musical instruments.

In another aspect, the invention features a plaything comprising a speaker, and a voice synthesizer for independently delivering, to a user of the plaything, voiced utterances via the speaker, and a wireless receiver for receiving information from a remote source to enable additional voiced utterances to be delivered to the user via the speaker.

In another aspect, the invention features a plaything comprising visual and tactile elements that simulate a real-world object and impart a fantastic aura to the plaything to enable fantasy play, a token reader for reading information encoded on a token inserted into the reader, and a wireless transmitter for sending the information to a computer to control the operation of the computer.

In another aspect, the invention features a plaything comprising visual and tactile elements that simulate a real-world object and impart a fantastic aura to the plaything to enable fantasy play, a touch sensitive input surface for receiving touch input from a user of the plaything, and a wireless transmitter for sending the information to a computer to control the operation of the computer.

In another aspect, the invention features a plaything comprising a digital still camera for capturing a digital image, a touch sensitive surface for enabling a user of the plaything to provide control information with respect to viewing and editing a displayed version of the image, and a transmitter for wireless communication of the digital image and the control information to the computer, and visual and tactile elements that simulate a real-world object and impart a fantastic aura to the plaything to enable fantasy play in connection with capturing, viewing, and editing the image.

In another aspect, the invention features a plaything comprising a speaker, and a voice synthesizer for independently delivering, to a user of the plaything, voiced utterances via the speaker, and a wireless receiver for receiving information from a remote source to enable additional voiced utterances to be delivered to the user via the speaker.

In another aspect, the invention features a method for enabling fantasy play using a computer and a plaything, comprising at the plaything, delivering output and receiving input associated with the fantasy play, and generating control signals at the computer for controlling the output based on the input, and by wireless communication sending the control signals from the computer to the plaything and sending the input from the plaything to the computer.

In another aspect, the invention features a method for enabling fantasy play comprising configuring a plaything to have visual and tactile elements that simulate a real-world object and impart a fantastic aura to the plaything to enable fantasy play, receiving input from a user of the plaything and providing output to the user to aid in the fantasy play, and causing two-way wireless communication of the input and output between the plaything and a computer.

In yet another aspect, the invention features a method of enabling fantasy play comprising at the plaything, generating signals representing voiced utterances, and wirelessly sending the signals from a computer to a plaything for playback at the plaything in connection with the fantasy play.

In another aspect, the invention features a method for enabling fantasy play comprising configuring a plaything to have visual and tactile elements that simulate a real-world object and impart a fantastic aura to the plaything to enable fantasy play; at the plaything, reading information encoded on a token, and wirelessly transmitting the information to a computer to control the operation of the computer.

In another aspect, the invention features a method for enabling fantasy play comprising configuring a plaything to have visual and tactile elements that simulate a real-world object and impart a fantastic aura to the plaything to enable fantasy play, at the plaything receiving touch input from a user, and wirelessly transmitting the information to a computer to control the operation of the computer.

In another aspect, the invention features a method for enabling fantasy play comprising wirelessly receiving information transmitted from a plaything, and controlling the performance of multimedia material on the computer in response to the information received from the plaything.

In another aspect, the invention features a method for enabling fantasy play comprising delivering voiced utterances independently at a plaything, and wirelessly receiving information from a remote source at the plaything to enable additional voiced utterances to be delivered to the user via the speaker.

In another aspect, the invention features an interactive entertainment apparatus, comprising a data processor comprising a central processing unit, a data storage device coupled to the central processing unit, and a first wireless signal transceiver coupled to the central processing unit; a plaything simulative of a real object and usable for independent fantasy play, the plaything comprising at least one input device, at least one output device, and a second wireless signal transceiver coupled to the input device and to the output device; and a control program stored in the data storage device comprising instructions for causing the central processing unit and the plaything to interact in a fantasy experience, by receiving input signals from the second wireless signal transceiver, generating responsive output signals, and transmitting the output signals using the first wireless signal transceiver. Implementations of the invention may have a plaything which further comprises a computer data input device.

In another aspect, the invention features an interactive entertainment apparatus, comprising a data processor comprising a central processing unit, a data storage device coupled to the central processing unit for storing programs and data to control the central processing unit, and a first wireless signal transceiver coupled to the central processing unit; a digital image capture device simulative of a real camera, comprising a lens, a digital image storage device, means for capturing an image through the lens and digitally storing the image in the digital image storage device, and an interface for communicating the stored image to an external device; a plaything simulative of a real object and usable for independent play, the plaything comprising at least one input device, at least one output device, an interface for receiving the stored image from the digital image capture device, digital means for visually manipulating the stored image, and a second wireless signal transceiver coupled to the input device and to the output device; and a control program stored in the data storage device comprising instructions for causing the central processing unit and the plaything to interact in a fantasy experience, by receiving input signals from the second wireless signal transceiver, generating responsive output signals, and transmitting the output signals using the first wireless signal transceiver.

Advantages of the invention include the following. Children may engage in complex and stimulating fantasy play by interaction with the computer and the plaything, or may use the plaything separately without the computer. The computer can cause the plaything to generate sound, speech, music, and visual displays in coordination with a computer display. The devices interact wirelessly and thereby cause no concern about electrocution of the child. The plaything and the computer are physically separated, and the child does not use the real keyboard or mouse of the computer, so that these devices are protected against damage by the child. The plaything can be reconfigured to provide different play experiences by changing the software running in the computer. Other features and advantages may become apparent from the following description, and from the claims.

Advantages of the invention include the following. Children may engage in complex and stimulating fantasy play by interaction with the computer and the plaything, or may use the plaything separately without the computer. The computer can cause the plaything to generate sound, speech, music, and visual displays in coordination with a computer display. The devices interact wirelessly and thereby cause no concern about electrocution of the child. The plaything and the computer are physically separated, and the child does not use the real keyboard or mouse of the computer, so that these devices are protected against damage by the child. The plaything can be reconfigured to provide different play experiences by changing the software running in the computer. Other features and advantages may become apparent from the following description, and from the claims.

DESCRIPTION

FIG. 24 is a side elevation of a rocking horse plaything and two sample computer screen displays;

Figure 1:
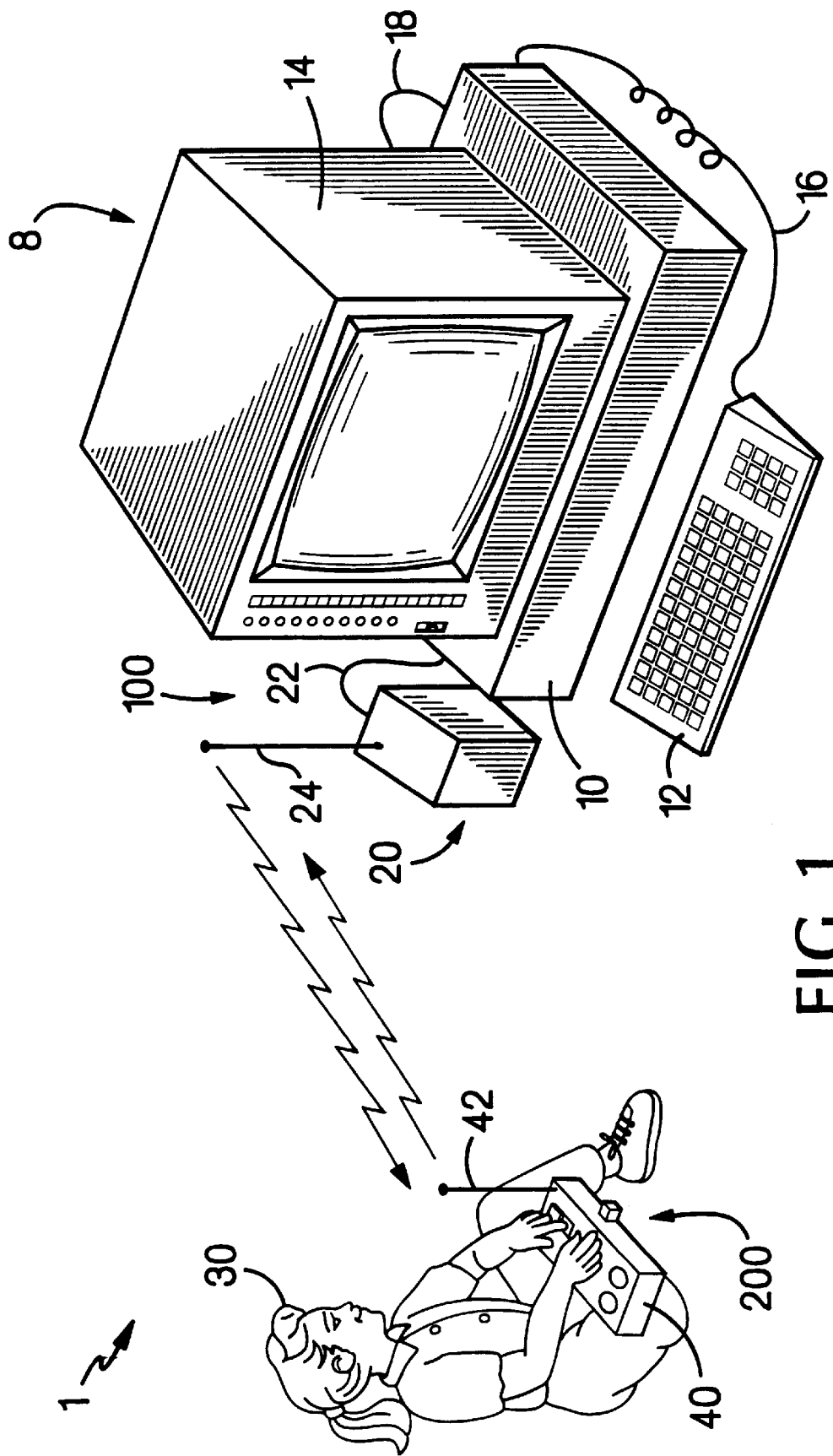
FIG. 1 is a perspective view of a child using an interactive plaything with a computer.

As shown in FIG. 1, a young girl 30 plays interactively with a plaything 200 aided by a personal computer system 8 and a transceiver 20. The computer 8 has a central processing unit (CPU) 10 which receives input from a keyboard 12 coupled by a cable 16 to the CPU 10. A CRT display 14 is coupled to CPU 10 by cable 18.

The transceiver 20 enables two-way wireless communication between the CPU and the plaything. The transceiver is coupled to the CPU using cable 22, and transmits and receives signals to and from the plaything using an antenna 24. The transceiver enables the computer to send and receive information to and from the plaything via the transceiver, to enable the plaything to provide interactive fantasy simulation of the behavior of a corresponding real-world object. Alternatively, the computer and plaything can communicate using infrared transceivers.

Figure 2:
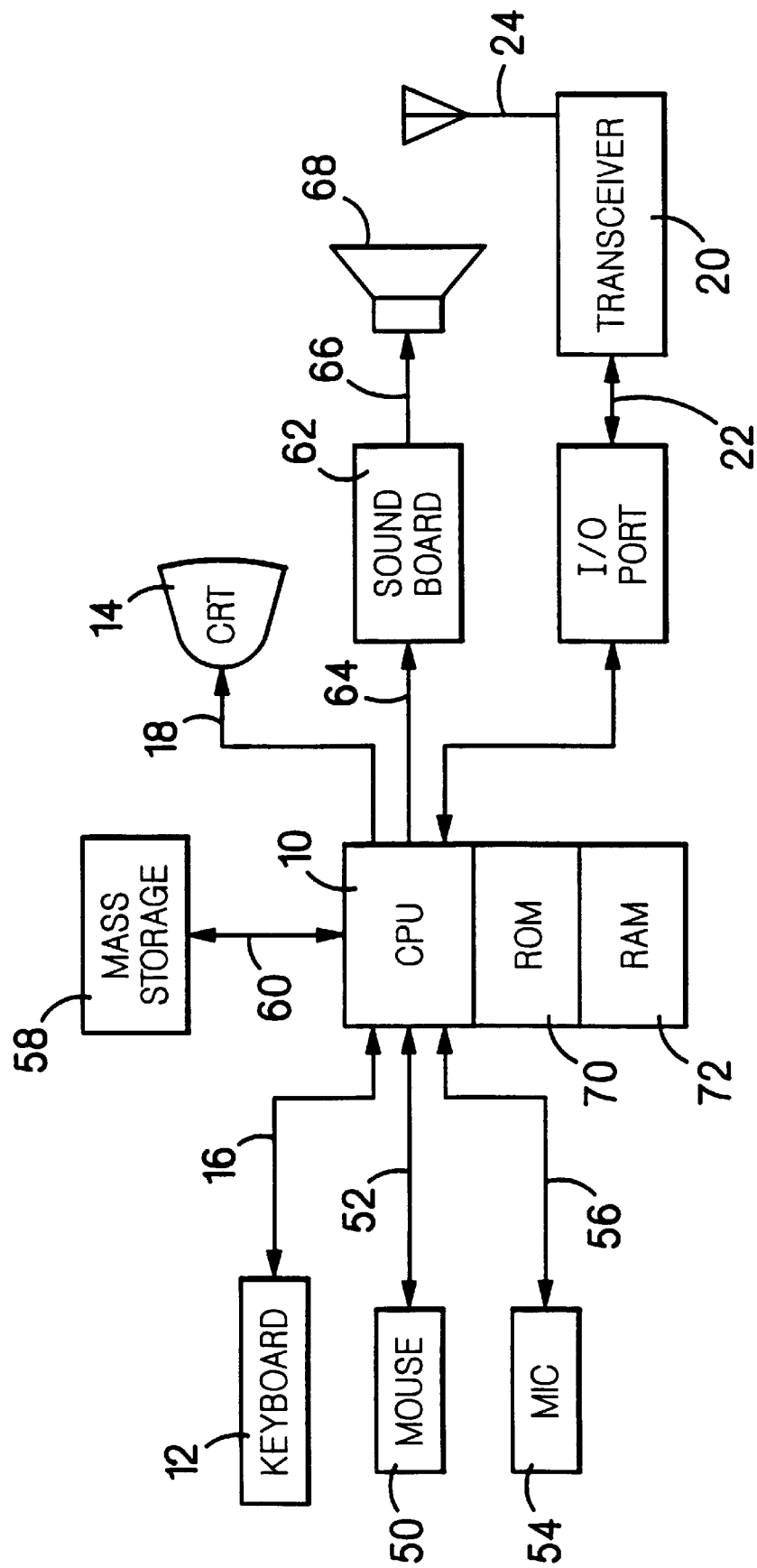
FIG. 2 is a block diagram of the computer system of FIG. 1.

As seen in FIG. 2, in computer system 8 the CPU receives input signals 16, 52, 56 from the keyboard 12, a mouse 50 and a microphone 54. A mass storage device (e.g., a hard disk) 58 holds computer programs and data for use by the CPU 10, and communicates with the CPU 10 via signals 60. The CPU also has a read-only memory (ROM) 70 and a random access memory (RAM) 70 to store and run programs.

The computer system is equipped with devices to provide multimedia output to the child, including sound, speech, and music. The CPU provides a sound driver signal 64 to a sound generating circuit board 62. The sound board 62 in turn generates an amplified audio signal 66 to drive a loudspeaker 68. These devices enable the CPU to generate synthesized speech, sound effects, and music in coordination with the plaything, under the control of a program loaded from the mass storage device and held in the memory.

The plaything 200 (FIG. 1) includes a controller 40 which is sized for play by the child 30. The controller includes a transceiver (not shown in FIG. 1) which can transmit or receive signals to and from the computer system using antenna 42. Thus, the computer can wirelessly transmit control signals to the plaything to command the plaything to activate lights or play sounds. The wireless transmission can be done using radio-frequency (RF) signals, infrared signals, or any other equivalent means. The computer can also wirelessly send data, such as digitally encoded speech, to the plaything. The transceiver also enables the child to give input to the computer by pressing buttons or other controls in response to prompts displayed on the CRT 14. Because the communication is wireless, the child's play is not encumbered by wires and parents may be confident that the child will not be hurt by electricity.

Figure 3:
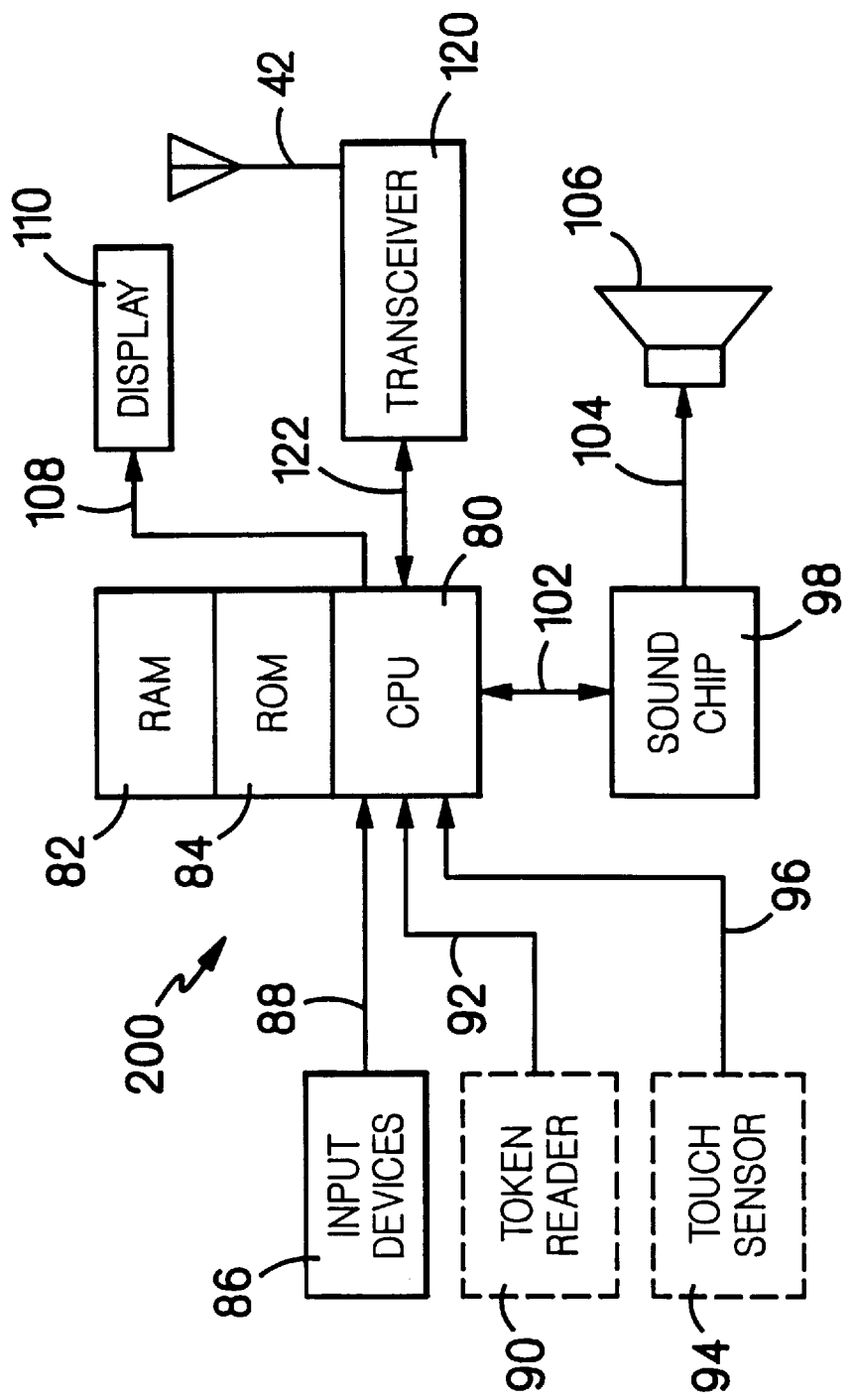
FIG. 3 is a block diagram of circuitry in the plaything.

As shown in FIG. 3, operation of the controller is governed by a CPU 80 which is coupled to a sufficiently large ROM 84 and RAM 82 to store and operate a control program. The CPU 80 receives at least one input signal 88 from input devices 86 which may include buttons, switches, knob, or throttles on the plaything.

Optionally the CPU receives an external data signal 92 from a token reader 90. For example, the plaything may have a card reader responsive to illustrated cards inserted into the reader by the child to select a mode or feature offered by the program running in the computer system. The CPU also can receive a touch sensor signal 96 as input from a touch sensor 94.

The CPU 80 generates a display signal 108 to drive a display 110 such as a liquid crystal display (LCD). The CPU also gives a sound driver signal 102 to a sound chip 98. The sound chip processes the driver signal and generates an audio output signal 104 to drive a loudspeaker 106. Thus, under control of the programs in the computer system and in the memories coupled to the CPU, the plaything can generate synthesized speech, sound effects, or simple music. This enables the plaything to act more realistic by having a "voice" in coordination with a program running on the computer 8.

The CPU 80 also transmits and receives data via antenna 42. The antenna is coupled to a transceiver 120 which communicates with the CPU using digital data on signal 122. The transceiver also generates an amplified signal for output transmission via the antenna 42, and receives and decodes signals arriving via the antenna. The transceiver 120 in the plaything is compatible with the transceiver 20 coupled to the computer, so that the plaything and the computer can communicate data and commands as the computer 8 is running a program to entertain or educate the child. The transceiver can use RF signals, infrared signals, or other equivalent means.

Figure 5:
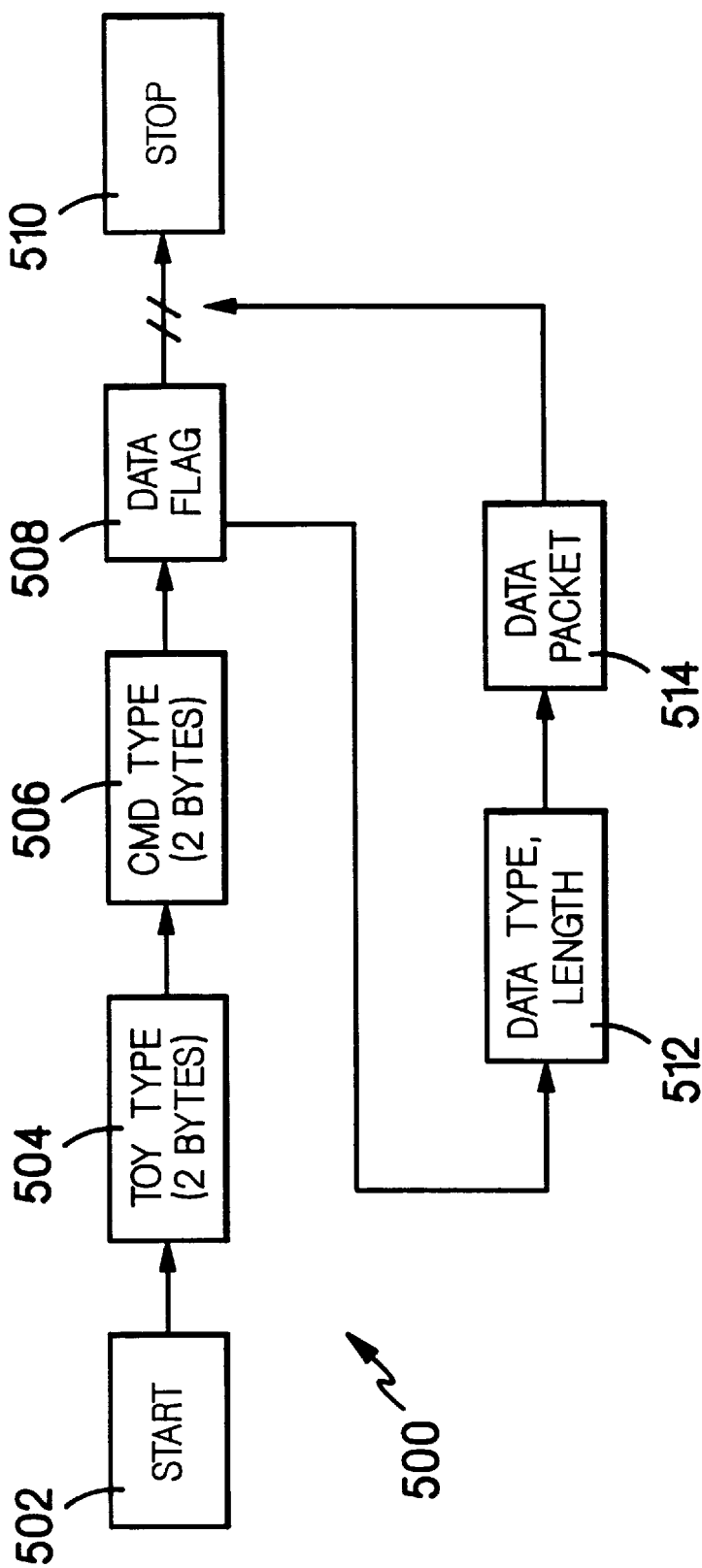
FIG. 5 is a block diagram of a message communicated between the plaything and the computer system.

FIG. 5 shows a typical digital message 500 communicated between the transceivers. Since the computer can communicate commands and different types of data to the plaything, a fixed message format is used so the plaything can separate commands and data upon receipt. The message begins with a start byte 502 such as an 8-bit ASCII character. The specific character is encoded into the program running in the CPU of the plaything, to enable the CPU to recognize the start of the message. The start byte is followed by a 2-byte toy type code 504 to identify the specific plaything with which the computer is communicating. As shown in FIG. 6 through 27, many different types of playthings are contemplated, each having a unique toy type code to enable the computer to distinguish between playthings.

The toy type code is followed by a 2-byte command type code 506 which identifies the specific command for the plaything to execute. For example, a command can cause the plaything to illuminate a light, read the status of a sensor, or read the value of a slide control. The command is followed by a one-bit data flag which is set true if data follows and false if no data follows. If the data flag is false, the message concludes with a stop byte 510. Optionally the stop byte can include a checksum code or a CRC bit to enable the plaything to check the entire message for transmission errors.

If the data flag is true, the message continues with a 2-byte data type code 512. This code identifies the type of data which follows, and its length in bytes. Actual data 514 follows. For example, data type codes can signify digitally encoded speech, music, or text for display on the plaything. The message may contain more than one pair of the data type code 512 and data 514, such as one pair for speech and another pair for music.

Each of the playthings of FIGS. 4 and 6 through 26 has visual and tactile elements that simulate a real-world object and impart a fantastic aura to the plaything to enable fantasy play, an input device for receiving input from a child, an output device that provides controlled output to the child to aid in the fantasy play, and a transceiver connected to the input and output devices, for two-way wireless communication with a computer. A portion of each plaything (such as a housing) includes the components of FIG. 3, and there is at least one computer program for the computer system 8. The program provides games and educational activities for use by a child in coordination with the plaything. The specific actions carried out by the computer programs, and the responses of the programs to manipulation of the plaything by a child, vary according to the nature of the plaything.

The playthings described below all permit the child to enter into a fantasy play experience enhanced by images, sounds, music and speech generated by the computer under program control. Thus, the computer imparts a fantasy aura to the plaything which stimulates the child's imagination more richly and vividly than a toy standing alone. The plaything is enjoyable to the child and effective for play as a standalone toy, without a computer or software. The computer and software provide enriched activities, but they are not required for fantasy play by the child. However, the child's interaction with the computer enhances the child's fantasy play because it allows a wide variety of sounds and images to supplement the play experience.

Also, connection of a plaything to the computer allows some of the playthings described here to serve in multiple selectable different fantasy experiences. For example, the control panel playthings described below can be used for fantasy play with a simulated bulldozer, backhoe, airplane, or locomotive with the assistance of the computer and software. The physical elements of the plaything are designed both to aid the fantasy and to be generic enough to serve in multiple experiences.

The playthings described below can be grouped by general characteristics. One broad group is fantasy toys, which a child can use in a fantasy experience created by the child. Within this group, some of the playthings fall in a subgroup of classic fantasy toys committed to a single play scenario, such as the Driver Simulator. In this subgroup, the playthings provide visual, audible, and tactile elements which are recognizable as simulating a single real-world object, such as an automobile dashboard. Another subgroup of the fantasy toys includes more generic playthings for which the scenario can be selected and varied, such as the Master Control Panel. In this subgroup, the playthings provide visual, audible and tactile elements which are individually recognizable as simulative of real-world items, but which together do not simulate a single real-world object. The fantasy toys may be further classified as action toys (for example, the Master Control Panel); situation toys (for example, the Town Keyboard and Zoo Keyboard); or a combination of the two (for example, the Jane Rabbit plaything).

A second group of playthings generally includes educational input/output devices, such as the Globe. In this group, one goal of the playthings is some form of education about real-world facts. The playthings have input and output devices adapted for requesting and delivering factual information.

A third group of playthings generally includes useful tools, such as the Kids' Keyboard and Kids' Laptop. In this group, the playthings are children's versions of adult tools which accomplish real-world acts.

A fourth group includes game playthings, such as the Big Mat. In this group, the computer and software provide structured rules for a competition or game, and the playthings provide a physical environment for competing or playing according to the rules.

Driver Simulator

Figure 6:
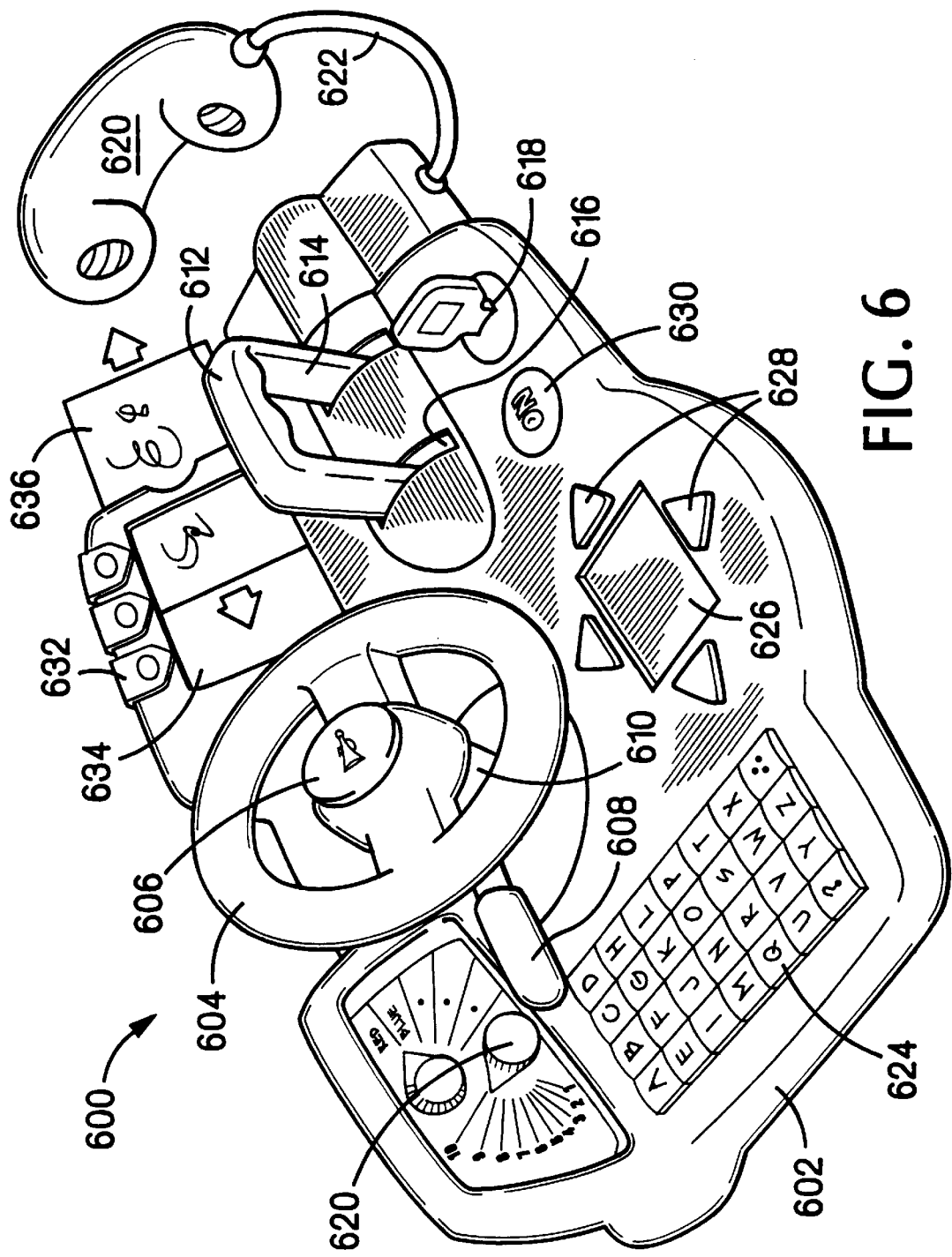
FIG. 6 is a perspective view of a plaything having elements which simulate an automobile dashboard.

In FIG. 6 the plaything provides a fantasy simulation of an automobile dashboard so a child can pretend to drive. The driving simulator 600 has a console 602 on which a toy steering wheel 604 is mounted. The child can rotate the steering wheel on a steering column 610 to simulate turning a car. The child can honk a horn button 606 mounted on the center of the steering wheel, and pretend to shift gears using a gearshift lever 608 is mounted on the steering column. The child can accelerate using a hand-operated throttle 612 mounted in the console; the throttle has two vertical struts 614 which are movable in corresponding slots 616. A simulated ignition key 618 is mounted in the console. A dial knob 620 is mounted in the console to enable the child to simulate turning on windshield wipers or other auto accessories. A telephone handset 620 is connected to the console with a cord 622 to simulate a car phone.

Other input devices allow the child to control a cursor shown on the CRT 14 and give input to the computer 8. A touch pad 626 allows the child to "point" to items on the CRT by pressing the touch pad at a point corresponding to a location on the screen. Cursor control buttons 628 permit the child to identify items on the display by pushing a button pointing in the appropriate direction. An alphabetic keyboard 624 is provided so the child can give alphabetic responses. A power button 630 allows the child to turn the plaything on or off.

The console also has a token reader 634 and corresponding function selection buttons 632. The child can place a slidable token 636 (such as a "smart card") in the token reader to select a particular fantasy experience or story to be used in conjunction with the plaything. The token 636 bears words or symbols identifying different functions within a software program which implements the fantasy experience. The child can select a function of the program by pressing a button 632 corresponding to the desired function.

A token also can cause the computer to change the "personality" of the plaything. For example, if a child wants to pretend to be a railroad engineer, the child can insert a "train" token into the token reader. The CPU of the plaything reads data encoded in the token and branches to a "train" module of the computer program. This causes the computer to display a story about railroads, and to alter the behavior of the input devices of the plaything to correspond to those of a railroad locomotive. Similarly, in "train" mode, the computer causes the sound chip of the plaything to generate a locomotive whistle sound and engine noise corresponding to images displayed on the CRT.

Each of the input devices is coupled to the CPU of the plaything, to enable the child to use the steering wheel, horn, throttle, ignition key, and knob as input devices for the PC. The console contains the elements shown in FIG. 3, enabling the driver simulator to receive input from the input devices and to communicate with the computer.

This plaything is not a realistic simulator of a real-world experience; rather, the plaything has fantasy features and non-realistic controls which enhance the child's play activities. For example, knobs, handles, and switches are oversized, rounded, brightly colored, and fantastically shaped to incite imagination rather than duplicate reality.

Figure 7:
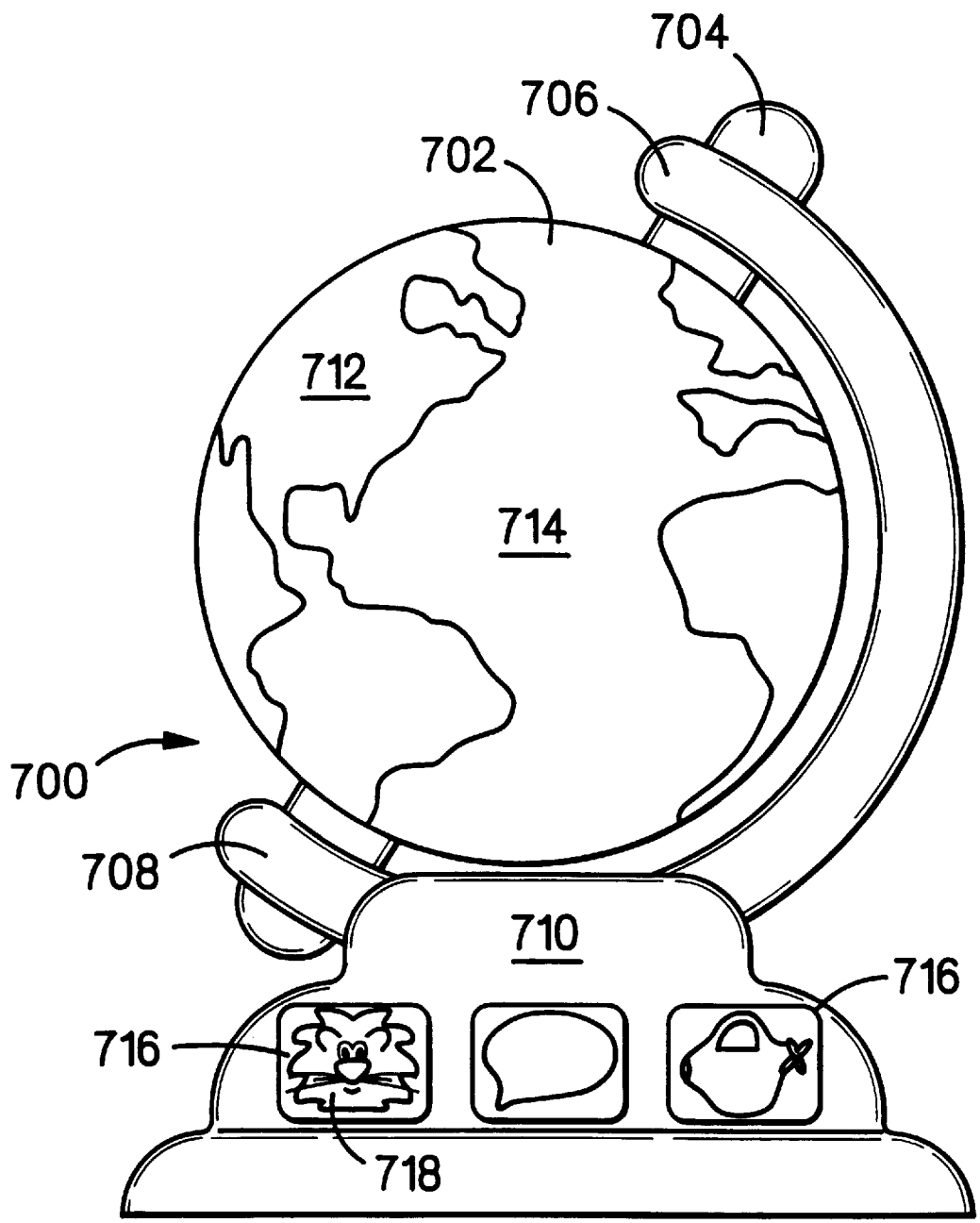
FIG. 7 is a side elevation of a plaything which simulates a world globe.

In FIG. 7 the plaything simulates a world globe. The globe 700 has a sphere 702 which a child can manually rotate on a spindle 704 mounted in a semicircular yoke 706. The base 708 of the yoke is held in a table stand 710 to enable a child to spin the globe forcefully without toppling it. The spindle is coupled to an optical encoder (not shown) which enables the plaything to read the rotation rate of the globe and report this data to the computer.

At least one touch-sensitive simulated continent 712 is mounted on the sphere 702. A touch sensor (such as a membrane switch, not shown in FIG. 7) is mounted within the continent. A child can press on the continent to command the computer to provide information as well as sounds, images, or a combination, about the continent, or a story about it. Similarly, the sphere has at least one simulated ocean 714 also equipped with a touch sensor for selecting information about the ocean.

The stand 710 has function selection buttons 716, each of which bears an icon 718 to identify its function. While the computer is running a program relating to the globe, such as a geography trivia program, the child can select features of the program by pressing one of the buttons 716. For example, one button may bear a bird picture, corresponding to a story about bird migration. Another button may bear a picture of a submarine, to activate a story about underwater life.

Each of these input devices is coupled to the CPU of the plaything, to enable the child to use the continents, oceans, and function buttons as input devices for the computer. The globe also can be used for fantasy play without a computer. For example, a child can use it in a school game in which the child pretends to be a teacher giving a geography lesson to playmates or dolls. The globe stand contains the elements shown in FIG. 3, enabling the globe to receive input from the input devices and to communicate with the computer.

Photo Works

Figure 8:
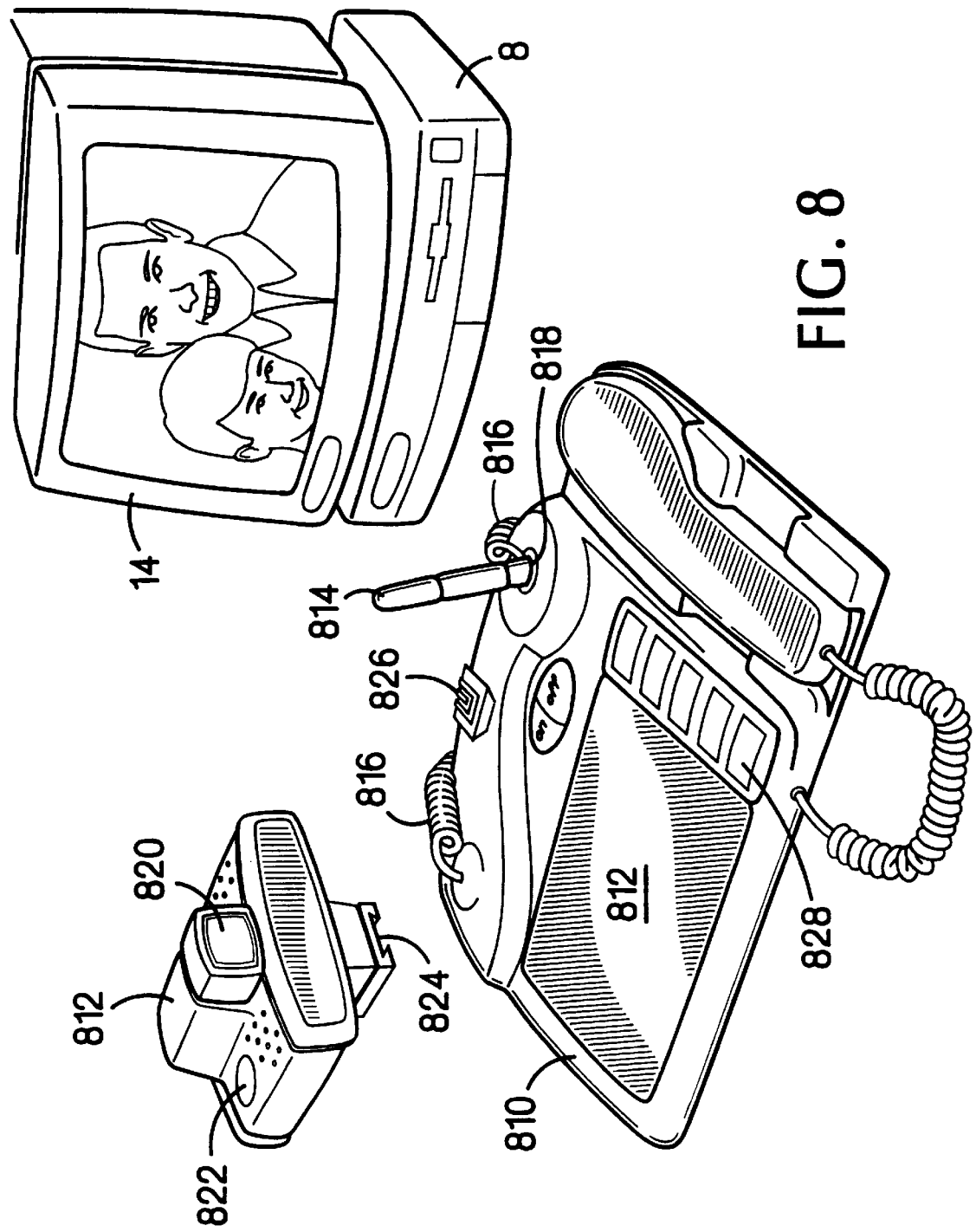
FIG. 8 is a perspective view of a plaything having a camera and sketch pad.
Figure 9:
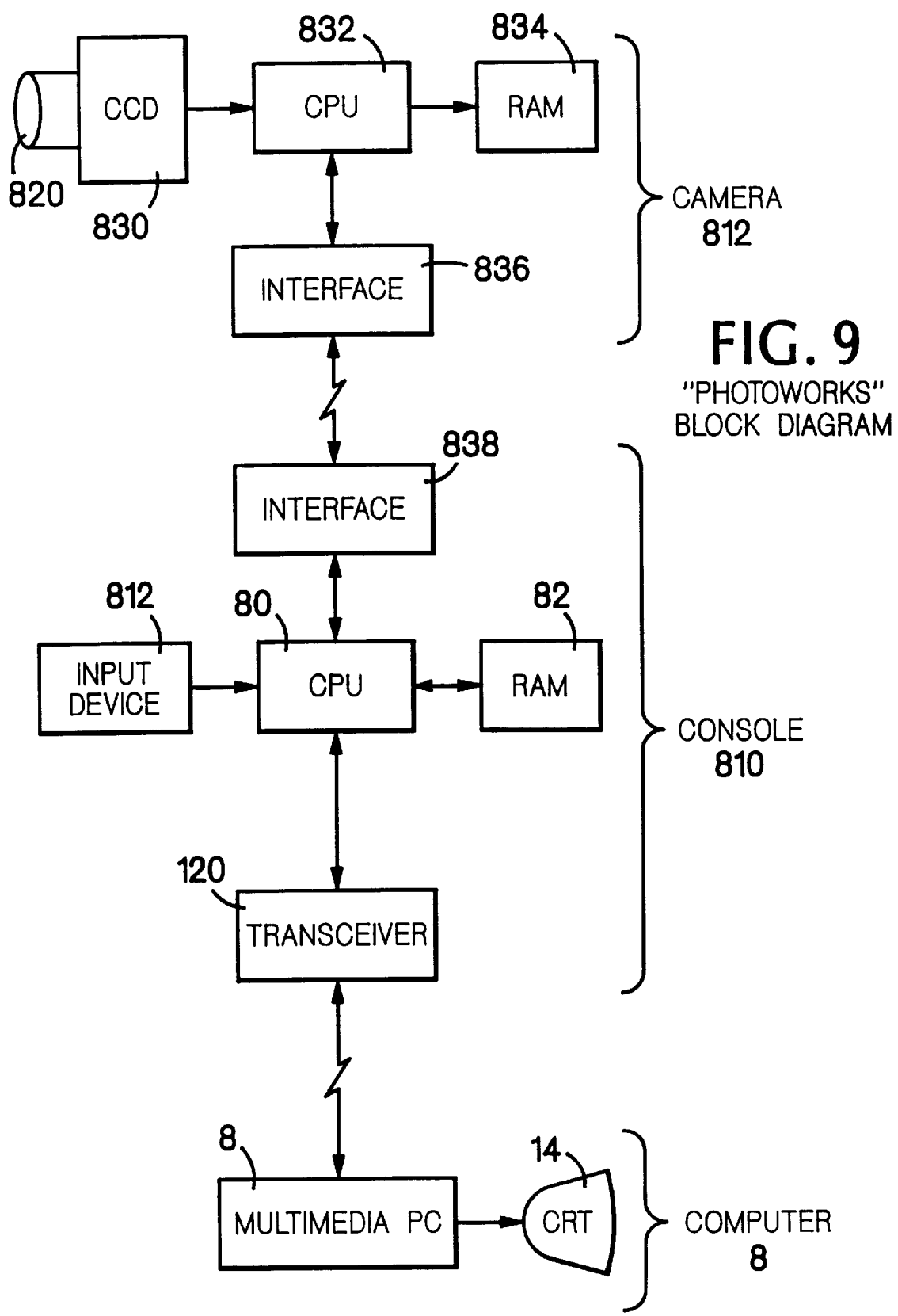
FIG. 9 is a block diagram showing a camera, a plaything, and a computer.

In FIG. 8 the plaything has a console 810 with a detachable camera 812. FIG. 9 shows communication paths between elements of the camera system. In conjunction with the computer 8, a child can use the camera 812 to take a digital picture; the digital image is transferred to the console and displayed on CRT 14. Using the console and software running on the computer, the child can color and alter the image, or create an album of images.

The console CPU receives input from the stylus 814 and the camera. The camera has a lens 820 coupled to a digital image processing circuit 830 (such as a CCD device) which feeds the received image to a camera CPU 832. The camera CPU stores the image in a local memory 834. When a child presses the trigger button 822, the camera takes a digital picture which is stored in the camera memory. The camera also has a hotshoe receptacle 824 mounted on the lower surface of the camera; the receptacle mates with a hotshoe 826 on the console. A digital interface 836 connects the CPU 832 to the hotshoe receptacle, and a compatible interface 838 connects the hotshoe to the console CPU 80. When the child couples the hotshoe receptacle to the hotshoe, the CPU 80 of the console senses the presence of the camera and retrieves a copy of the digital image stored in the camera. The CPU 80 then transfers a copy of the image to the computer using the transceiver in the console, and retains a copy of the image in the console memory.

Using a software program, the computer and console enable a child to color and alter images displayed on the CRT by using the stylus as a pen or marker. The console has a touch-sensitive digitizer surface 812 which is responsive to pressure from a stylus 814. The stylus is connected to the console using a cord 816. (In FIG. 8 the stylus is shown resting in a storage recess 818.) The console also has at least one drawing function button 828; the functions of these buttons varies depending on the software running in the computer 8. For example, a child can select a pen color by choosing a function button corresponding to the desired color. When the child moves the stylus on the digitizer, a corresponding colored line appears on the CRT and is added to the image in the console memory. The function buttons also can select textures which can be applied to the displayed image.

Another program allows a child to create an album of images stored on the mass storage device of the computer. Using the function buttons, the child can page through the album or search for selected images.

Control Panel

Figure 10:
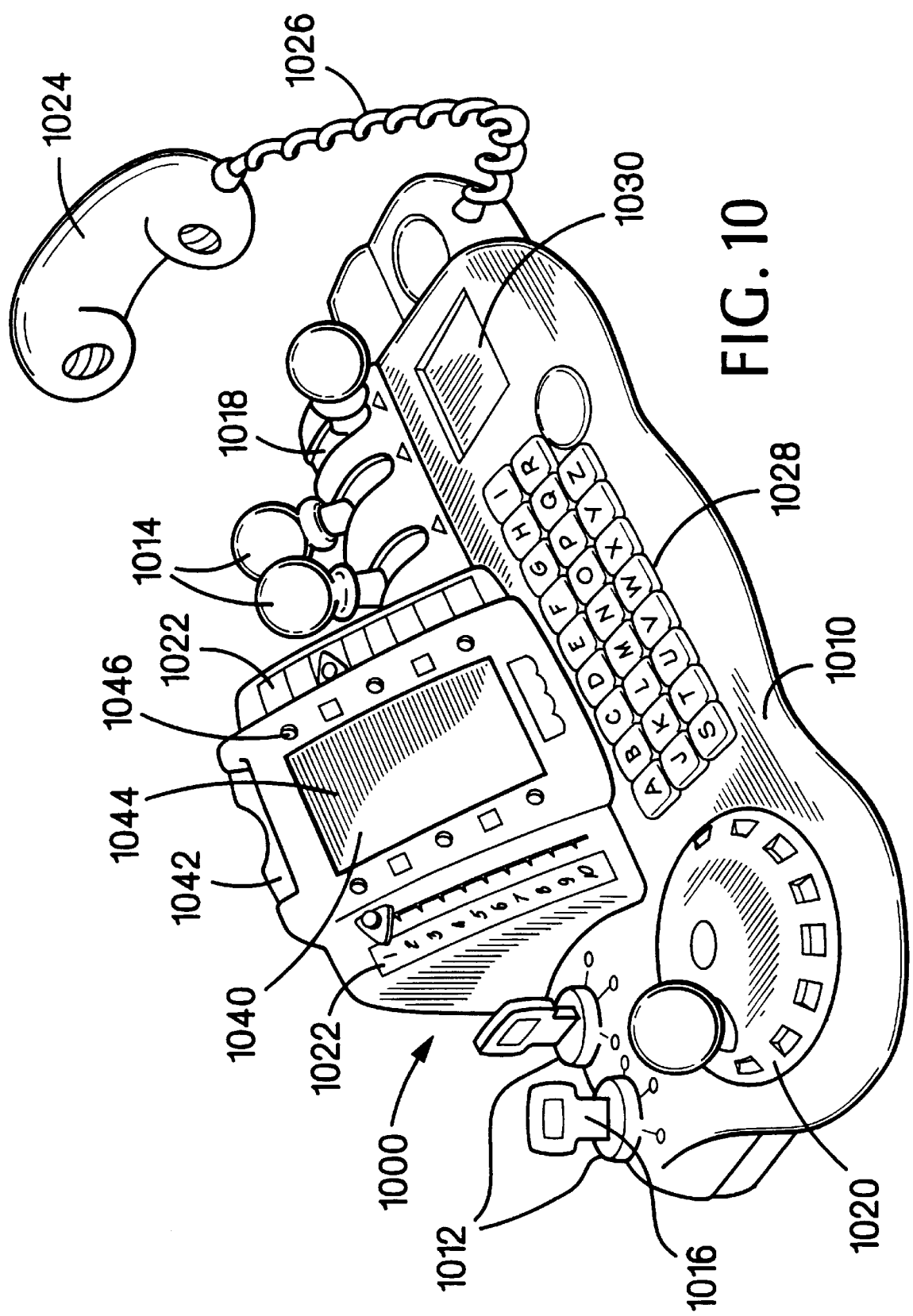
FIG. 10 is a front view of a plaything having elements of a control panel.

In FIG. 10 the plaything is a simulated control panel 1000 for a power plant, crane, elevator, dam, or bridge. The control panel has a housing 1010 with buttons, levers, keys, and knobs. For example, the housing has a pair of key switches 1012 on one side of the housing and three levers 1014 on the other side. The key switches include simulated keys 1016 which are rotatable to turn a selected function on or off. The levers slide in slots 1018 to simulate the action of real control levers. A rotating dial 1020 simulates a speed control or selector dial. The housing has sliding pointers 1022 to enable control of other simulated functions. A toy telephone receiver 1024 is connected to the housing by cord 1026 to enable a child to simulate conversations with the computer or characters in a story.

The housing also has several input devices for the computer. An alphabetic keyboard 1028 permits a child to enter alphabetic responses to the computer. A touch pad 1030 operates in a manner similar to a conventional mouse, to enable a child to move a cursor on the CRT by sliding a finger over the touch pad surface.

A token reader 1040 enables a child to change the personality of the control panel. Configuration tokens (not shown in FIG. 10) are inserted into the upper slot 1042 of the token reader. The face of each token includes text labels which are visible through the front window 1044 of the reader. The text labels identify functions performed by buttons 1046 located in a pair of vertical rows on the sides of the reader. One token enables a child to use the control panel to simulate operating construction machinery. The token has such labels as BULLDOZER, CRANE, BACKHOE, etc. To simulate operating a crane, the child presses the button 1046 adjacent the CRANE label on the token. This selection is communicated to the computer by the CPU 80 in the housing, and the child can then use the levers 1014 and the other controls to simulate control of a crane. Corresponding images are displayed on the CRT by the computer.

The Master Console

Figure 11:
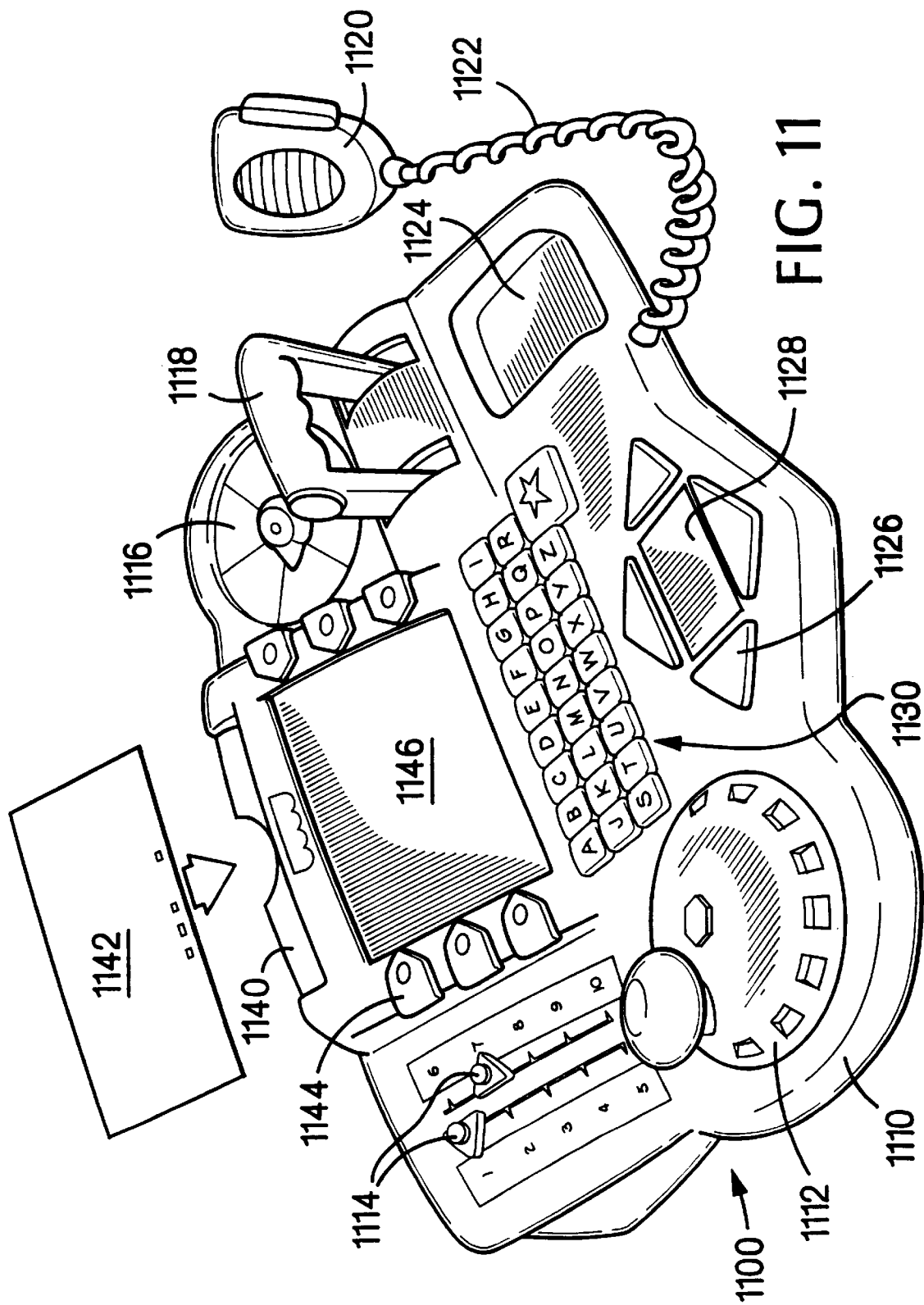
FIG. 11 is a perspective view of a plaything having elements of a vehicle control panel.

In FIG. 11 the plaything is a master console 1100 which a child can use to simulate being an air traffic controller, a police or fire department dispatcher, or a railroad engineer. The housing 1110 has a rotating controller 1112, a pair of sliding controls 1114, a rotating color selector 1116, and a movable lever-type throttle 1118. A simulated radiotelephone handset 1120 is connected to the housing by cord 1122; when not in use, the handset rests in a recess 1124.

The housing also has controls for computer function selection and cursor control. Four directional arrow buttons 1126 are provided for cursor control, and a touch pad 1128 provides an alternate form of cursor control. The touch pad operates in the same manner as touch pad 626 described in the discussion of FIG. 6 above. A child can give text input to the computer using the alphabetic keyboard 1130.

The housing has a personality card slot 1140 for receiving personality cards 1142 which correspond to programs running on the computer 8. The cards have text labels to identify functions available in the programs. When the cards are inserted in the card slot, the labels are visible through a window 1146 and line up with the function buttons on either side of the window. To act as a fire dispatcher, the child presses the corresponding function button by viewing the personality card. The plaything communicates this choice to the computer, which loads and runs an appropriate simulation program.

The Kids' Laptop

Figure 12:
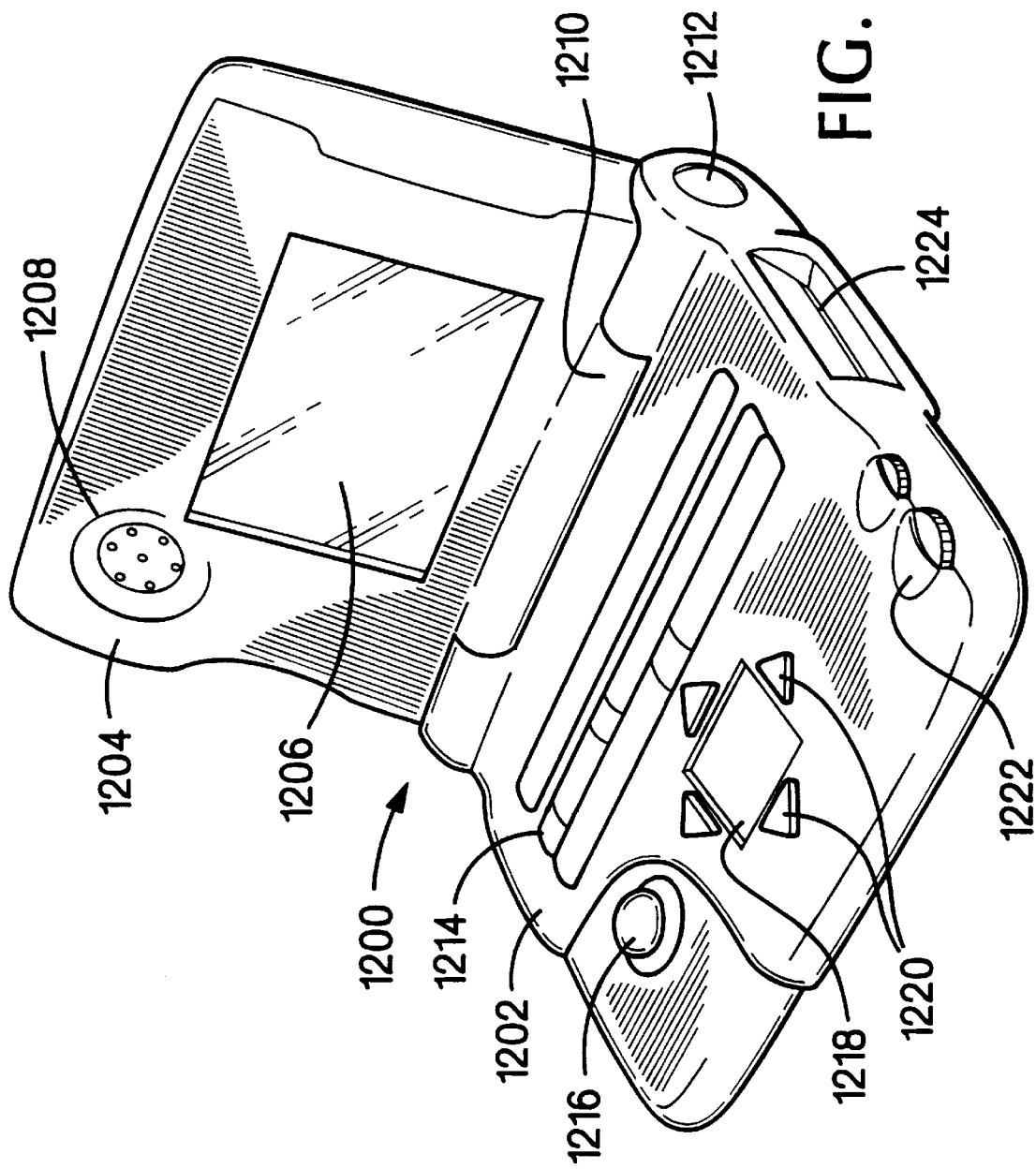
FIG. 12 is a perspective view of a plaything which simulates a laptop computer.

In FIG. 12 the plaything is a simulated laptop computer 1200. Like real laptop computers, the housing 1202 has a flip-up lid 1204. A child can view a simulated display screen 1206 mounted in the lid, and a loudspeaker 1208 in the lid enables the toy laptop to play sounds and music. A hinge 1210 of the lid can rotate up or down on a hinge pin 1212.

The housing is also equipped with controls like those found on a real laptop, such as a keyboard 1214, a trackball 1216, a touch pad 1218 for cursor control, a set of cursor control keys 1220, and screen brightness and contrast controls 1222. A simulated diskette drive slot 1224 is provided on one side of the housing. This slot contains a token reader to read a token such as a ROM cartridge or a "smart" card. Inserting a token into the slot causes the laptop to operate according to a prerecorded program stored in the token. For example, one program, in conjunction with a separate program running in the computer 8, provides an alphabet lesson. Other programs for the laptop provide education about how a real computer works or about shapes and sounds. Alternatively, the tokens are flat plastic pieces with holes or slots cut in one edge of the card. Placing the token in the reader causes the slots or holes to make or break contacts in the reader, thereby selecting a program feature or software module.

Keyboard for Kids

Figure 13:
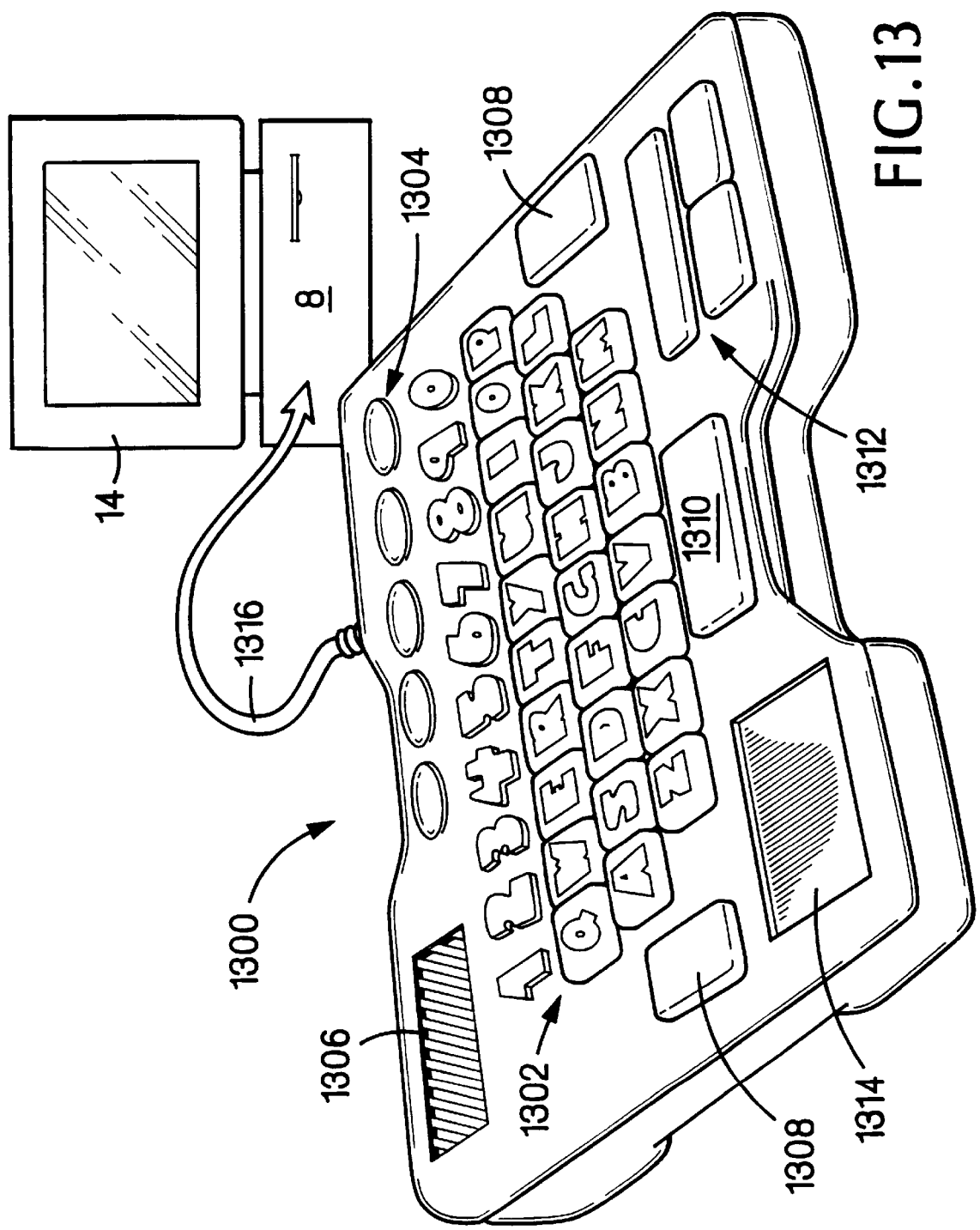
FIG. 13 is a perspective view of a plaything which simulates a computer keyboard.

In FIG. 13 the plaything is a simulated keyboard 1300 which permits children to use their own computer keyboard without damaging the real keyboard connected to the computer 8. The simulated keyboard 1300 generally resembles a real unit, and has a set of alphanumeric keys 1302 arranged in the standard QWERTY format. The keys are oversized both to emphasize the alphanumeric labels on them and to facilitate use by a child's fingers. Moreover, the keys have a non-realistic fantasy appearance that permits a child to use the keyboard for fantasy play without a computer. For example, the keys have fattened labels, bright colors, and do not provide all the special characters and marks normally provided on a typewriter keyboard. Thus, the plaything does not provide a strictly accurate simulation or duplication of a real keyboard; rather, the plaything has a fantastic aura that encourages play activities with or without a computer. A pair of SHIFT keys 1308 adjacent to the alphabetic keys to permit upper-case letters to be used. The housing also has a space bar 1310 below the bottom row of alphabetic keys to permit entry of blank spaces in text. The keyboard has several function keys 1304 above the top row of alphanumeric keys; using the function keys, a child can select functions in the same manner used for the F1–F12 keys on a real personal computer keyboard.

The housing has arrow keys 1312 mounted in one corner; a child can control a cursor by pressing an arrow pointing in the appropriate direction. A touch pad 1314 provides an alternate method of cursor control.

A loudspeaker 1306 adjacent to the function keys enables the keyboard to play music or sounds. The entire housing is coupled to the computer 8 using a cable 1316 which is plug-compatible with a real personal computer keyboard compatible. Thus, although the keyboard 1300 is a fantasy plaything, it duplicates most functions of a real keyboard, enabling a child to enter text, select functions, and control a cursor exactly as if the child was using a real keyboard. The keyboard 1300 can be used with the same type of programs, running in the computer 8, described above with respect to the KIDS' LAPTOP plaything.

The Zoo Keyboard

Figure 14:
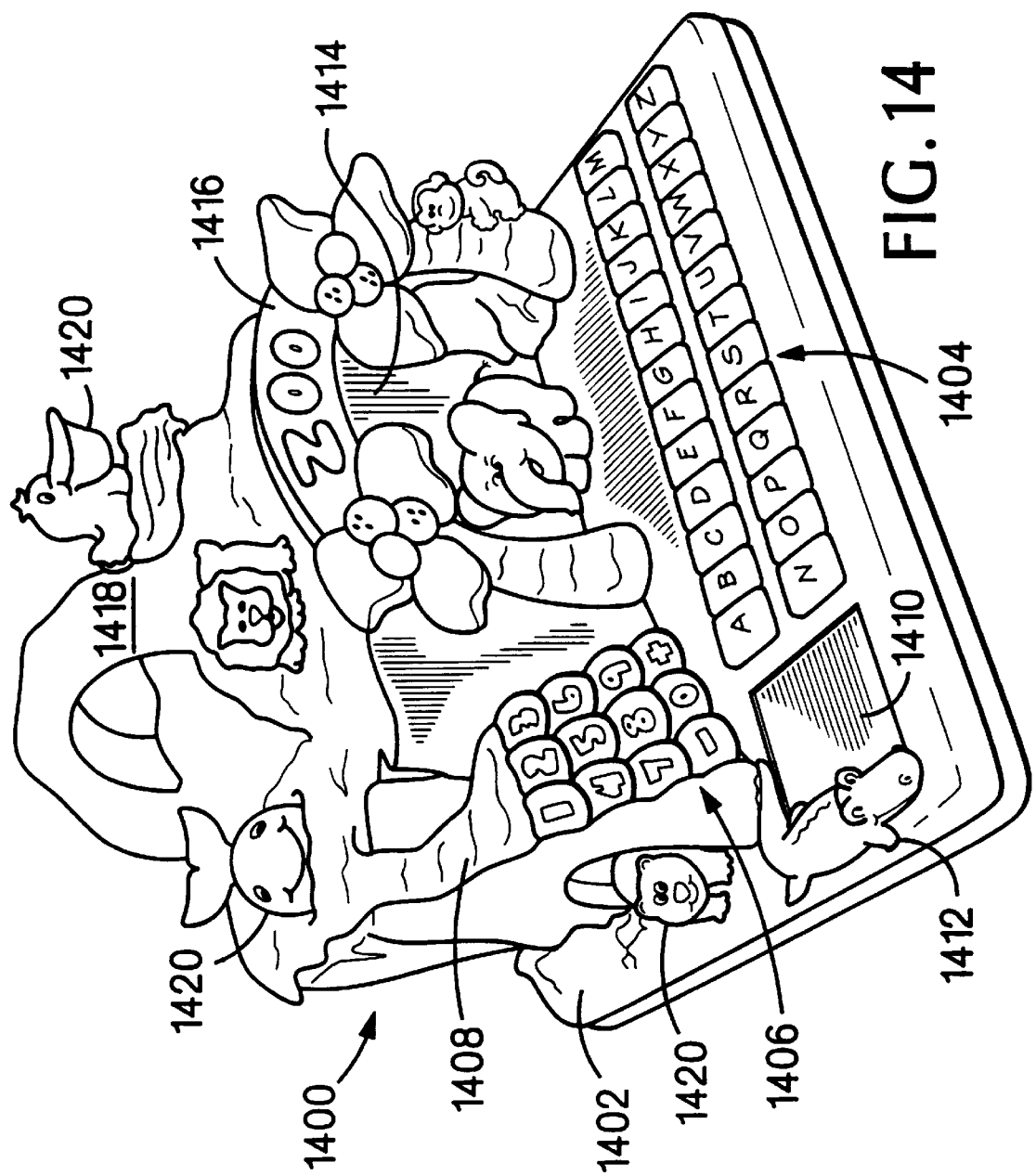
FIG. 14 is a perspective view of a plaything having elements of a zoo.

In FIG. 14 the plaything is a zoo keyboard 1400, that is, a keyboard combined with elements of a zoo. The zoo keyboard has a housing 1402 on which alphabetic keys 1404 are mounted to permit a child to give a text response to a query from the computer. Numeric keys 1406 are mounted on the housing, in the shape of a waterfall at the end of a river 1408. A touch pad 1410 for cursor control of the computer is located next to the alphabetic keys, and is embellished with a fantasy replica of an animal such as an alligator 1412. A loudspeaker 1414 plays sounds and music under the control of the sound chip. The loudspeaker is concealed by elements simulating the entrance to a zoo, such as a sign 1416, palm trees, animals, and other elements. A portion of the housing 1402 is formed in the shape of a rock arch 1418 which can be used as a handle.

The housing also has one or more pushbuttons 1420 formed to simulate real animals (or fantastic anthropomorphized characterizations of real animals). The pushbuttons act as input devices to the computer. By pressing the animal pushbuttons, a child activates a function of a computer program running in the computer. The computer can run programs of the type described above in connection with FIG. 11 and 12, as well as programs giving education or entertainment about zoos or animals.

The Town Keyboard

Figure 15:
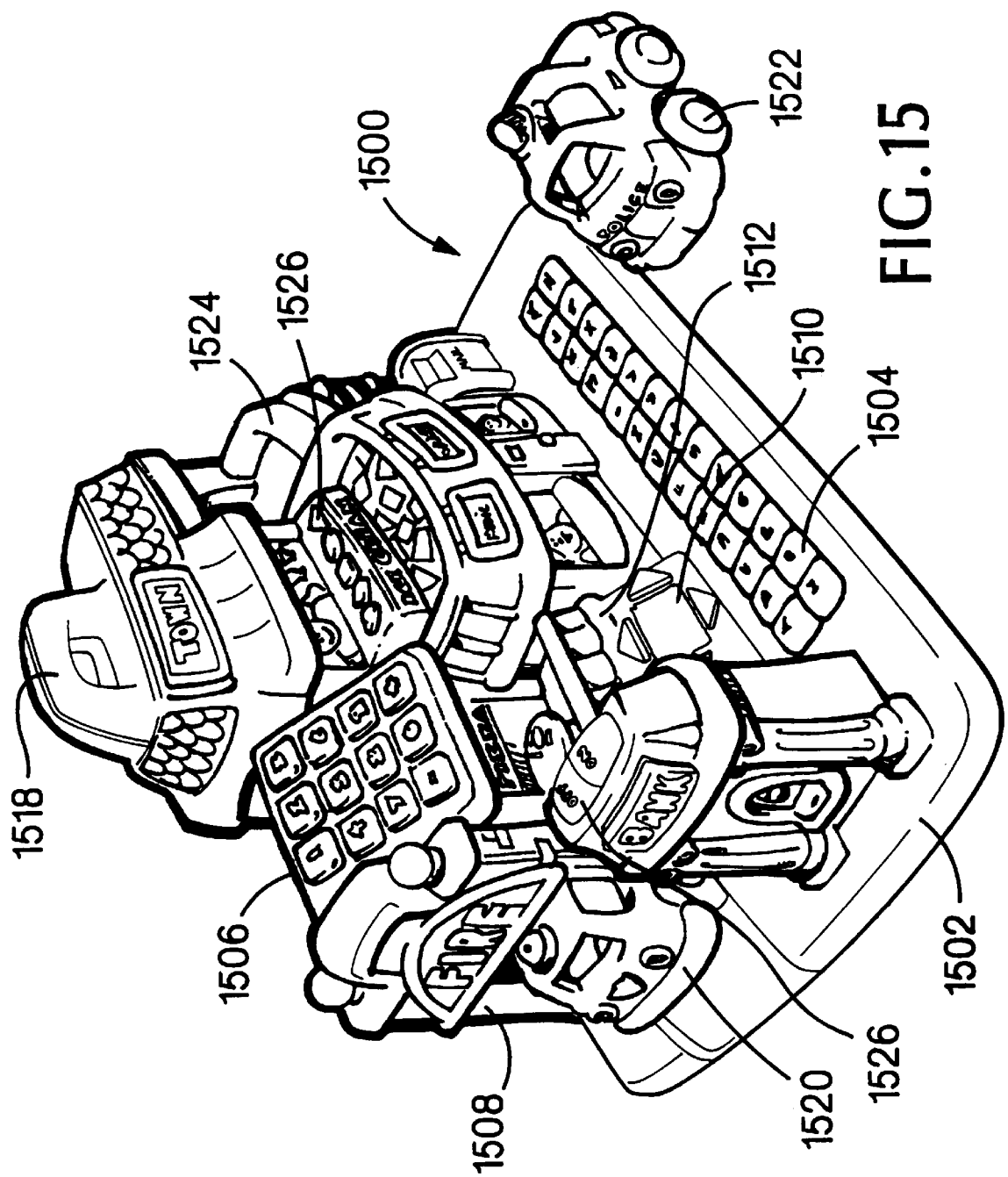
FIG. 15 is a perspective view of a plaything having elements of a town.

In FIG. 15, the plaything is a town keyboard 1500, i.e., a keyboard combined with elements of a town. The town keyboard has a housing 1502 on which alphabetic keys 1504 are mounted; the alphabetic keys permit a child to give a text response to a query from the computer. Numeric keys 1506 are mounted on the housing on a portion of a building, such as on the roof of a simulated fire station 1508. A touch pad 1510 for cursor control of the computer is located next to the alphabetic keys. The touch pad is embellished with a replica of an architectural element such as a wall 1512. A portion of the housing 1502 is formed in the shape of an arch 1518 which can be used as a handle.

Separate toy vehicles can be stored in the housing and used for play with the plaything. For example, a toy fire engine 1520 is housed in the fire station 1508, and a toy police car 1522 is provided for play in conjunction with a police station 1524 on the housing.

The housing also has one or more pushbuttons 1526 formed in portions of buildings of the town, such as in the roofs. By pressing the pushbuttons, a child activates a function of a computer program running in the computer. The computer can run programs of the type described above in connection with FIG. 11 and 12, as well as programs giving education or entertainment about features of a town, occupations, or main streets of famous cities. The town keyboard plaything has several design features which contribute to the fantastic aura conveyed by the plaything. For example, the fantastic aura is achieved in part by overlapping different simulated buildings, by representing only a part of each building, and by overlapping and exaggerating architectural features of the buildings, such as signs, roofs, and doors. The fantastic aura of the plaything is also enhanced by the integration of the input devices (such as keyboard 1506) into architectural features of elements of the plaything. These design features impart a non-realistic, fantastic aura to the plaything, which encourages fantasy play.

The Farm Keyboard

Figure 16:
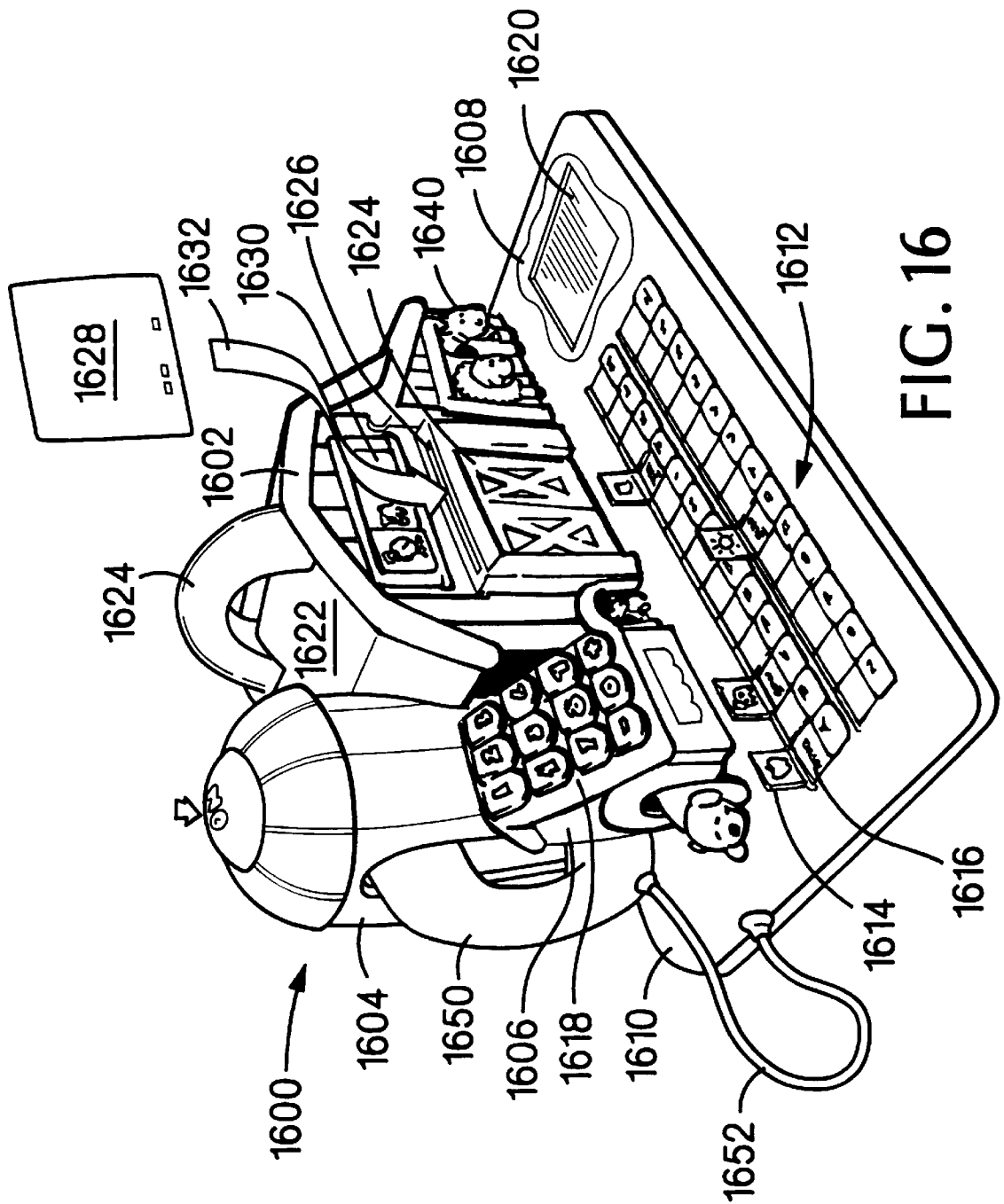
FIG. 16 is a perspective view of a plaything having elements of a farm.

In FIG. 16, the plaything is formed as a farm keyboard 1600, i.e., a keyboard combined with elements of a real farm such as a barn 1602, a silo 1604, a doghouse 1606, and a pigs' mud puddle 1608, all mounted on a base 1610. The base has alphabetic keys 1612 on it which permit a child to give a text response to a query from the computer. Each key also has a pop-up picture 1614 associated with it, which pops up when the key is pressed. For example, pressing the A key causes a picture of an apple to pop up above the A key. The pop-up picture reveals a label 1616, such as a word corresponding to the pop-up picture.

Numeric keys 1618 are mounted on one of the farm elements, such as the roof of the doghouse 1606. A touch pad 1620 for cursor control of the computer is located next to the alphabetic keys and is located within the simulated mud puddle 1608.

The barn roof 1622 includes a child-sized handle 1624 which can be used to pick up and carry the plaything. The barn door 1624 is surrounded by a frame 1626 containing a slot to receive a card 1628. The card 1628 contains labels corresponding to functions of a program running in the computer; the functions can be selected by pushbuttons 1630 located above the barn door. When a card is placed in the slot, as shown by the arrow 1632, function labels on the card line up with the pushbuttons. Thus, the pushbuttons can be used for different functions depending on the features of the software.

A toy telephone handset 1650 rests in the silo and is connected to the base by a cable 1652. A child can make simulated telephone calls using the toy telephone.

The housing also has one or more pushbuttons 1640 formed to simulate real animals or anthropomorphized characterizations of real animals. By pressing the animal pushbuttons, a child activates a function of a computer program running in the computer. The computer can run programs of the type described above in connection with FIG. 11 and 12, as well as programs giving education or entertainment about farms or farm animals.

The City

Figure 17:
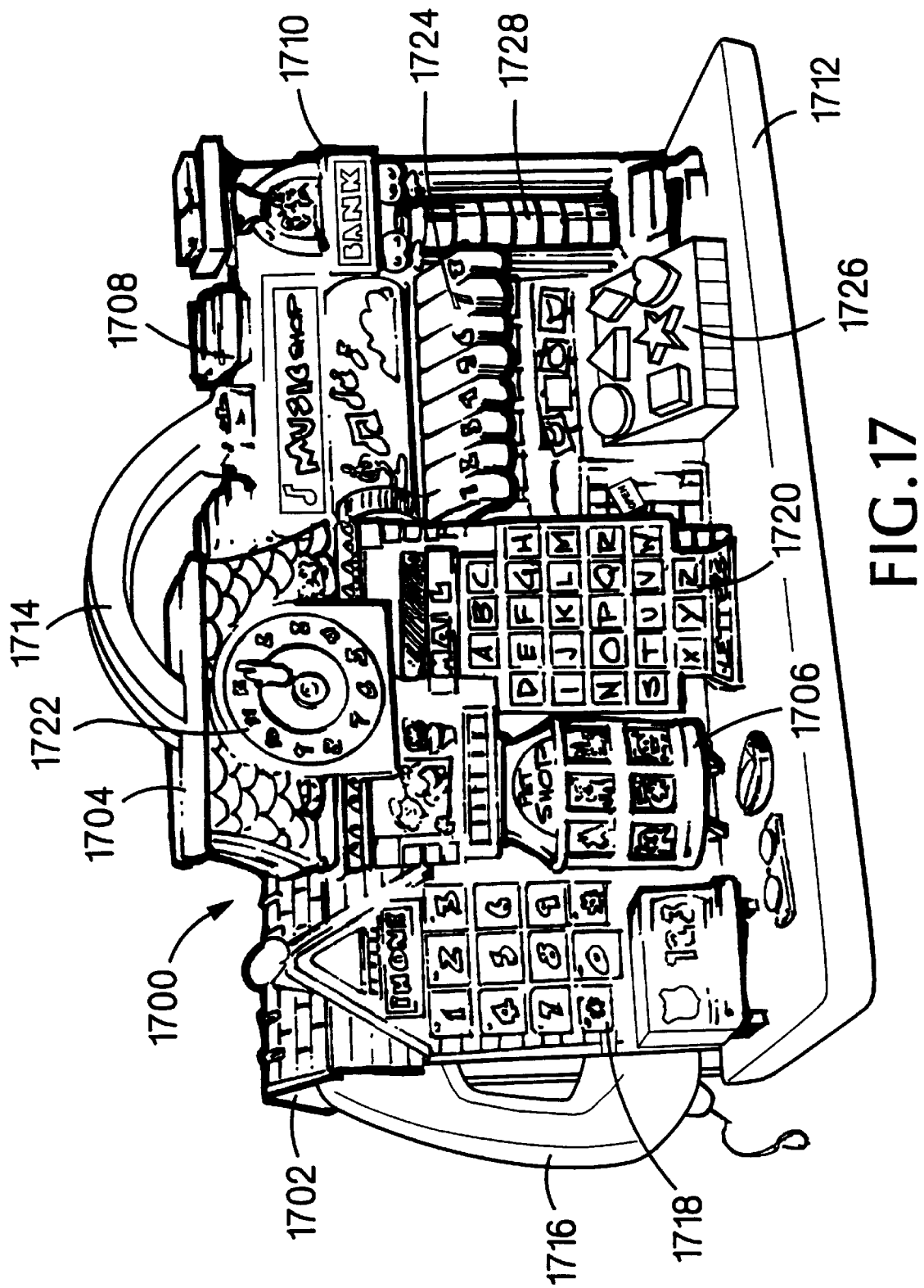
FIG. 17 is a perspective view of a plaything having elements of a city street.

In FIG. 17 the plaything is a simulated city 1700 with computer control elements embedded in elements of the city which interest children, such as a shop 1702, a post office 1704, a pet shop 1706, a music shop 1708, and a bank 1710. These elements are mounted on a base 1712; the plaything can be lifted and carried away using a handle 1714 which is formed in the top of the city elements.

A child can pretend to make phone calls from the city street by using a toy phone handset 1716 which rests in a recess in the shop 1702. A keypad 1718 for the phone is embedded in the front wall of the shop. The front of the post office 1704 has an alphabetic keyboard 1720 which a child can use to write letters to friends. The post office has a toy clock 1722 on its roof which a child can use to learn to tell time.

The music shop 1718 has piano keys 1724 mounted on it, allowing a child to play music by pressing the keys. The child can select program functions using shape pushbuttons 1726 are mounted on the housing. The child can store coins in a coin sorter 1728 mounted in the bank 1710. The coin sorter has a pressure sensor associated with each coin denomination. By sensing the state of these sensors, a program running in the computer can prompt the child to place different coins in the coin sorter, and determine whether the child succeeds.

The city can be used with programs that educate or entertain about a day on a street in the city, streets around the world, people found in a city street, or songs.

The Vanity

Figure 18:
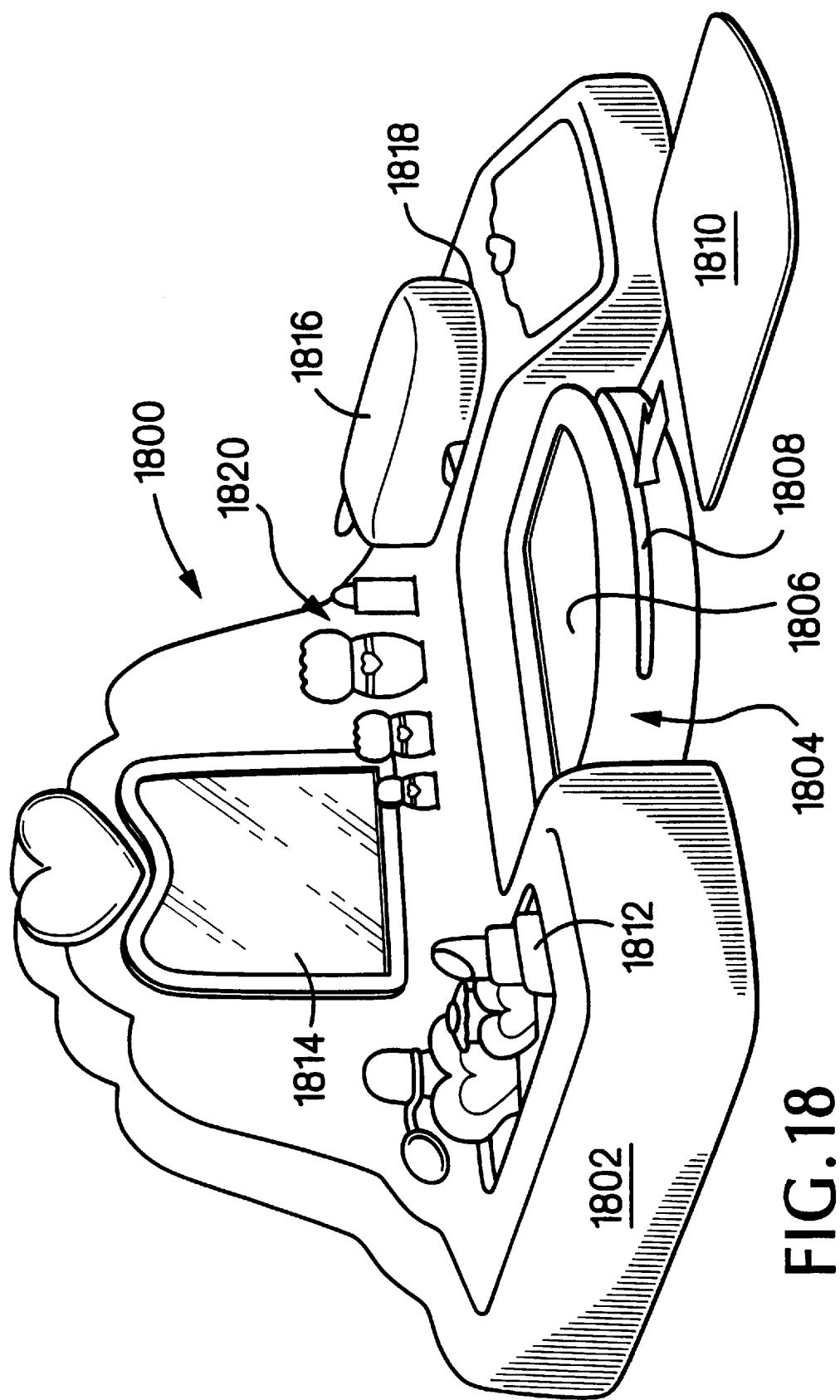
FIG. 18 is a perspective view of a plaything having elements of a vanity.

In FIG. 18 the plaything is a simulated vanity table 1800 which has a base 1802 surrounding a touch pad 1804. The housing contains the circuitry shown in FIG. 3.

The touch pad has a transparent touch-sensitive top layer 1806, and a front slot 1808 into which cards 1810 can be inserted. The cards bear labels which are visible through the top layer 1806. A child can select a function of a program running in the computer by viewing a label on the card and pressing a portion of the touchscreen overlaying the selected label. The cards can be changed to correspond with different programs running in the computer.

The housing has removable toy makeup items 1812, a mirror 1814, and a toy telephone 1816 resting in a recess 1818. A child can use these items for play independent of the computer or its programs.

The housing also has pushbuttons 1820 for giving input to the computer and for selecting functions available using programs running in the computer. These buttons, and the touch pad, can be used with computer programs relating to makeup, coloring, dressing, and other activities.

The Big Mat

Figure 19:
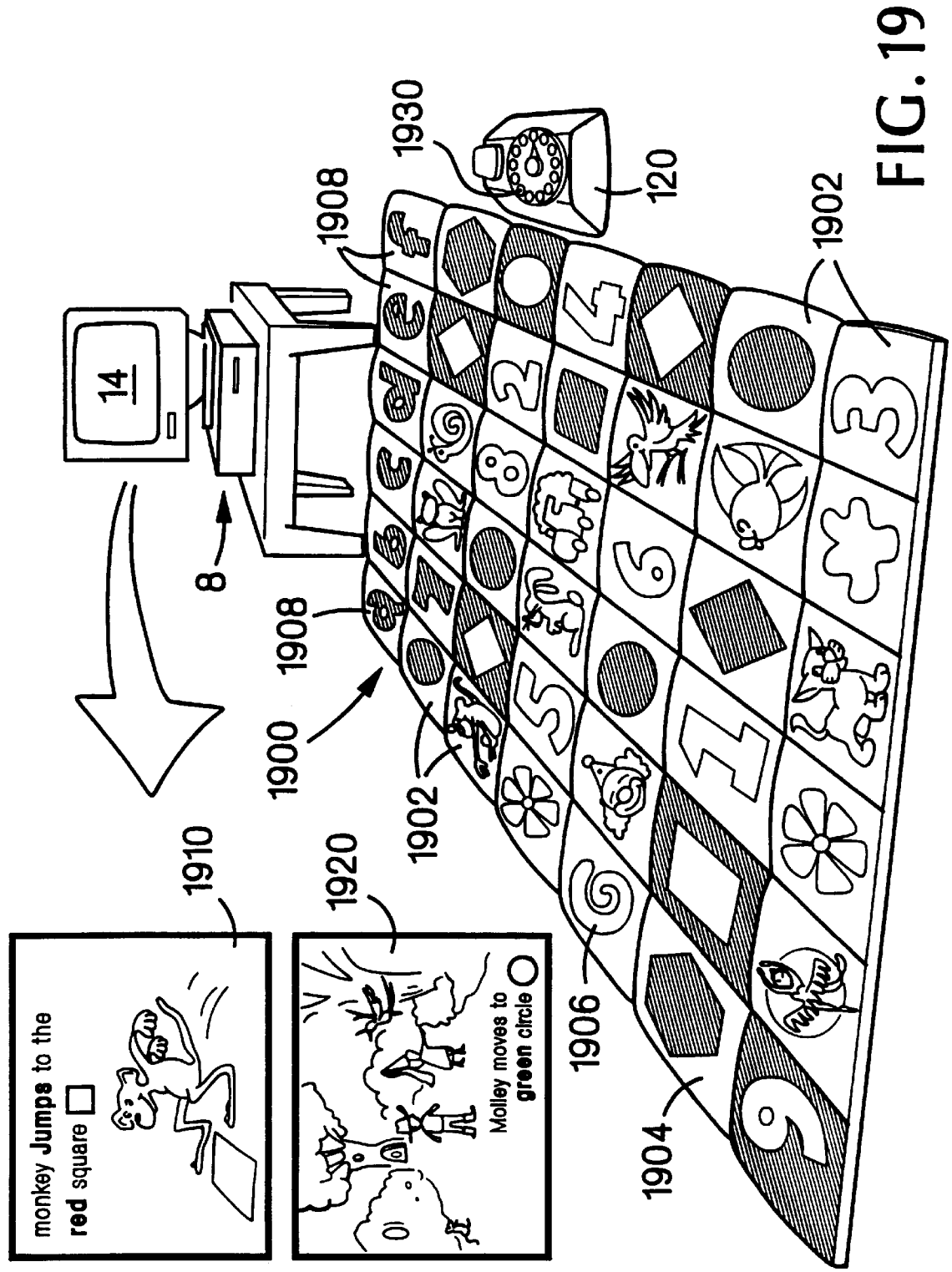
FIG. 19 is a perspective view of a big mat plaything and two sample computer displays.

In FIG. 19 the plaything is a big mat 1900. The big mat utilizes the natural physical energy and activity of children. The mat 1900 is subdivided into squares 1902. Each square bears a unique color 1904, symbol 1906 (such as numbers, letters, shapes, or animals), or combination. A pressure sensor is associated with each square. For example, the sensor can be embedded in a fabric mat or attached to the underside of squares of the mat. Signals from the sensors are coupled to the computer 8. By reading the state of the sensor signals, the computer can sense whether a child is standing on a square, and can identify exactly which square is occupied.

The computer and mat can be used in many different games and educational activities. For example, software in the computer can facilitate an exploratory story in which children participate. Each child (player) is designated by a unique color or symbol corresponding to a square on the mat. Each child begins the game by standing on his square. The computer displays an animated character, corresponding to each child, on the computer display. Through the animated characters, the computer gives instructions to the players and senses their position on the mat as the instructions are carried out. For example, Player Blue's animated character might say, "Blue Player—jump onto the yellow square!" As the blue player moves to the yellow square, the computer causes the animated character to move through a fictional scene shown on the display, such as through a forest or house, as required by the story. Other exemplary displays 1910, 1920 are shown in FIG. 19.

If the child moves to the wrong square there is no action on the screen except a prompt from the character to try again to find the yellow square. If the child or children get bored and start running around, the story is interrupted and the computer displays an interrupt image. For example, the computer can display an image representing the map with each square illuminated as the children step on it, or the computer can display a playful image such as a bug running around in circles. When the players settle down the computer would display a transitional message (for example, "Now let's return to the story") and a transitional image. The computer would then resume telling the story at the point of interruption.

Another software activity is a "Simon Says" type game. The "game master" is Mr. Monkey. Mr. Monkey says "Simon says go backwards one square and rub your stomach," or "Go forward three squares." Periodically, the monkey says: "I bet you're on the blue square," because the computer knows where the child is on the mat. An exemplary display 1910 for this activity is shown in FIG. 19.

Another activity is a game where the child sees a falling square on the screen and has to find the matching square on the mat before it hits the screen mat and lights it up. A voice helps the children know where the matching square is. The child or children tries to save the squares before they hit the screen mat. If they find all the squares then they have completed the game and fireworks go off in celebration.

On one side of the mat are letters 1908 that are also used for musical notes. The child makes musical rhythms by stepping on the different letters. The musical notes are illustrated on the screen simultaneously as the child steps on the letters.

The Big Mat as a standalone toy can be a very versatile game mat that can be used with the whole family. For example, there could be a spinner 1930 attached to the controller (the box that transmits information to the computer and the toy) to play games like Twister. The mat could also be used to play games like Hop Scotch.

This plaything engages children in physically active play while interacting with the computer; provides a variety of play experiences, e.g., storytelling, games, dramatic play, learning; and encourages social play with two or more children. It is rich in learning activities. The child will learn: number, shape, animal, color, and letter recognition; counting and vocabulary; direction, i.e., backwards, forward, right, left; listening skills and self control (waiting his/her turn); kinesthetic learning where the child learns through movement; creativity; empathy and social interaction.

Animal Picnic

Figure 20:
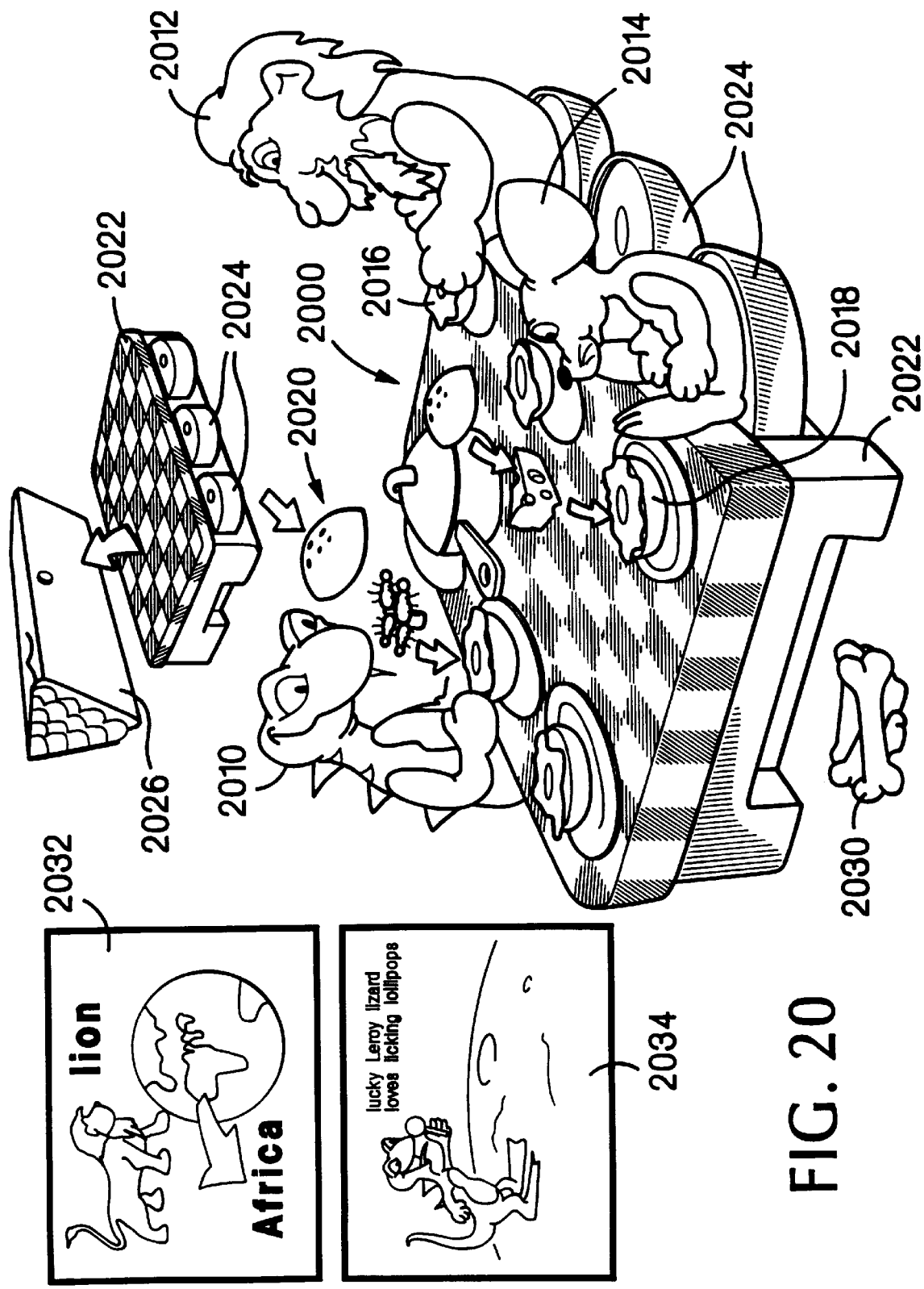
FIG. 20 is a perspective view of an animal picnic plaything and two sample computer displays.

In FIG. 20 the plaything is an Animal Picnic play set 2000 composed of six different animal characters (of which three are shown in FIG. 20 identified by reference numerals 2010, 2012, and 2014, different animal food pieces 2016, 2018, 2020 and a picnic table 2022 with chairs 2024. The play set is neatly packaged as a picnic box with the table as the bottom of the box and with a top 2026. The food and the animal characters have electronic sensors/pins that work with the hardware and software.

One or more children begin the activity by placing the animal characters in the chairs. The children find out that certain characters cannot sit next to each other, e.g., the sheep cannot sit next to the lion. A character on the screen playfully explains why the sheep and lion should not sit side by side. This teaches the child, particularly the older ones, something about the food chain.

Each toy animal has a corresponding screen character. As the children play and prepare food for the animals, they discover that each animal likes to eat. They learn which ones like meat (carnivores), which ones like leaves and grass (herbivores) and which like both (omnivores). For example, the children can make up a beef bone burger for Ms. Lion which involves counting—it takes three beef bones 2030 to make a burger for Ms. Lion. There are bug burgers 2020 for Mr. Lizard and cheese burgers 2018 for Mr. Mouse. The characters on the screen would eat the food and interact with the children asking for more food or drinks. The software makes it an interactive picnic among the children, toy animals and screen animals.

In another activity, the children can find out where the animals live through the use of clues. Once they discover the country, video sequences such as the exemplary display 2032 appear on the screen so the children can see what home is like for that particular animal. They also are able to see and hear other animals that live in the same place.

Each character has a story to tell the children. Some would be fun, silly stories about the character. For example, as shown in the exemplary image 2034, Mr. Lizard says, "Hi, I'm Leroy Lizard. Lucky Leroy Lizard loves licking lollipops!" The story animates on the screen.

Other software activities include animal puzzles and games. The screen animals would help the children complete the puzzles or games through rhymes as clues.

This play sets is ideal for children to engage in make-believe play. Its portability makes it easy for children to carry and play with wherever they go. It stimulates make-believe play, provides a socially interactive environment, and enables children to practice "real life" activities. Learning experiences are pervasive in the Animal Picnic. Children learn about: animal behaviors and habitats; story telling, vocabulary, alliteration; problem-solving; spacial relations; counting: weights and measurements; affective behaviors; geography; and different foods.

Science In A Box

Figure 21:
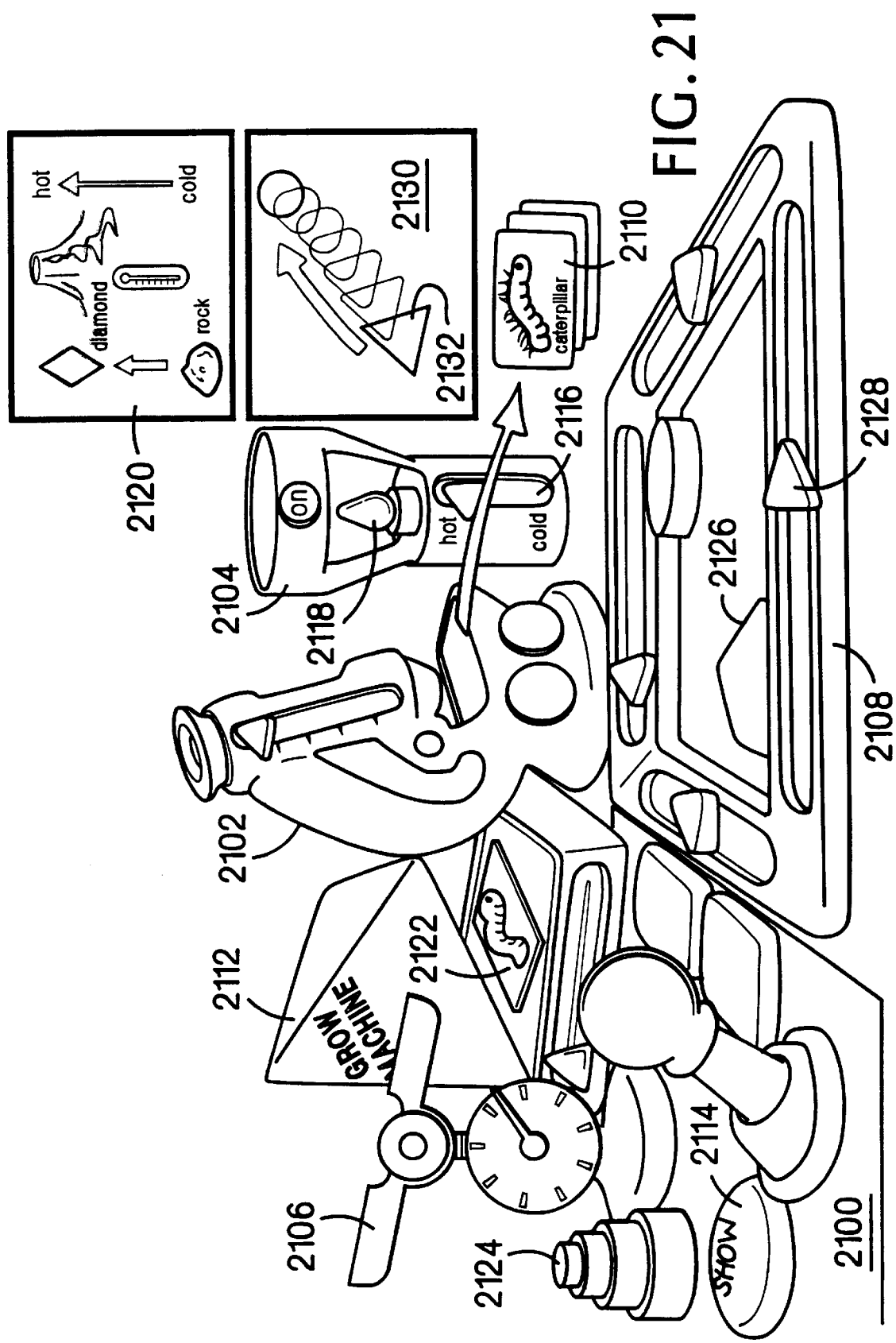
FIG. 21 is a front perspective view of an interactive science kit plaything and two sample computer displays.
Figure 22:
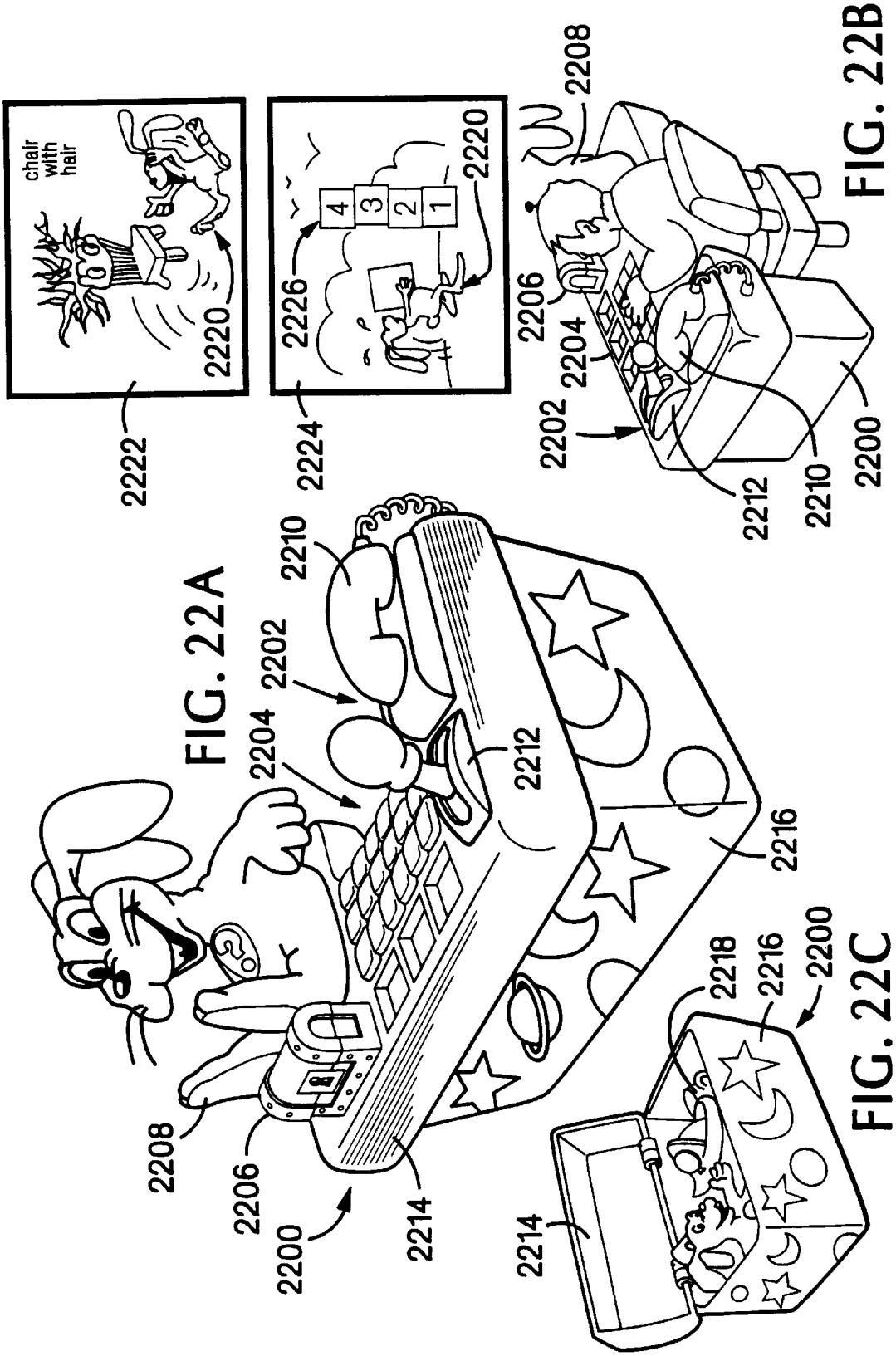
FIG. 22A is a perspective view of a plaything with elements of a desk and two sample computer displays.
FIG. 22B is a rear view of the desk plaything with a child seated at it.
FIG. 22C is a perspective view of the desk plaything with an open desktop.

In Science in a Box, shown in FIG. 21, the plaything is a group of devices such as a microscope 2102, a fake Bunsen burner 2104, a scale 2106, line and shape maker/distorter 2108, plastic "slides" 2110, and a "grow" machine 2112. The box is designed to encourage curiosity about science and foster observation and experimentation.

The software activities will be the visual reactions to what the child does with the scientific instruments. On the science console 2100 is a Show Me button 2114 so the child can choose when he wanted to see the reactions.

With the microscope 2102, the child puts in plastic "slides" 2110 of bugs, rocks, etc. and sees the object magnified on the computer screen 14. The microscope has a zoom feature with which the child can zoom in or out to look at the object. Placing the slide under the microscope also launches a science "dictionary" on the computer. The bug "slide" allows the child to navigate a wide array of pictures, animations and verbal descriptions of different kinds of bugs.

With the Bunsen burner 2104, the child "regulates" the temperature by moving the slider 2116 from cold to hot. Heat is represented by a glowing red bulb 2118. As an example, the child puts a rock on the Bunsen burner, moves the slider to hot and watches the rocks melt into volcanic lava on the screen as shown by display 2120.

In the Grow Machine 2112, the child puts in the slide of a caterpillar 2122 and sees a video on the screen showing the transformation of the caterpillar into a butterfly. The child could also play the video in reverse so that she could see the butterfly return back to a caterpillar. Through the use of time lapse photography, the child puts in a slide of a seed and sees it grow into a flower.

With the scale 2106, the child could use different sized blocks 2124 to balance the scale and discover mathematical concepts. For example, the child can investigate how many small circle blocks it takes to balance the scale that with one large circle block on it. The blocks are active so they appear on the screen simultaneously with the child's actions.

With the line shaper and distorter 2108, the child draws lines 2126 using the sliders 2128, then sees the lines distort and reproduce on the screen (as shown by lines 2132 on display 2130) with corresponding sounds.

The Science In A Box plaything stimulates exploration and experimentation; fosters collaborative play; and creates "what if" situations. It focuses on specific types of learning, such as: hypothesis testing; observation; visual discrimination and perceptual skill development; time concepts; weights and measurements; scientific concepts; collaboration.

Jane Rabbit

In FIG. 22A and 22B, the plaything is a desk 2200 which enables the child to play Jane Rabbit, a learning adventure story. As shown in FIG. 22B, the child participates in the story by sitting at the desk. The desk has an activity center 2202, keyboard 2204 and toy chest 2206. On top of the desk is a plush toy rabbit 2208 that is the child's "co-pilot" in the story. The toy rabbit is detachable so the child can carry it with him/her.

The desk has different learning materials, such as building blocks with different colors, shapes, numbers, words, and pictures on them. The activity center has a telephone 2210 and joystick 2212. As shown in FIG. 22C, the desktop 2214 is hinged to the desk base 2216 with detachable hinges, permitting the desktop to be raised or removed completely. The desk base is hollow and contains "dress up" clothes 2218 that match characters on the screen. The child chooses the clothes of the character s/he wants to be.

The keyboard 2204 works as a general purpose keyboard for any personal computer software application running on the computer 8.

An exemplary computer program for the plaything provides a story in which Jane Rabbit (the plush toy 2208) and her cousin rabbit 2220 (displayed on the computer screen 2222) are hungry and are trying to find a carrot to eat. You can hear their stomachs rumble. The beginning and end of the story are always the same but, in the middle, there are a number of different paths the child can take. During the adventure the toy rabbit 2208 acts as a guide or helper.

The story begins as a Living Book with the cousin rabbit 2220 playing the role of a magician's rabbit on a stage displayed on the computer screen, with all the magician's paraphernalia. The cousin rabbit 2220 encourages the child to explore the environment (a theme throughout) e.g., the orchestra plays when selected, the magic wand performs a trick, etc. The cousin rabbit starts out on a path, meets different characters and does different activities along the way. Each environment has a different learning activity. In the environment are a number of doors that lead the child to navigate the game differently each time.

In a first exemplary environment, the rabbit finds all kinds of rhyming objects. The child has to put together words that rhyme, e.g., "a chair with hair." The rhyme then animates on the screen 2222. There is a telephone in all the rooms in which the rabbit can call the child by name and talk to him/her.

In the next room, as shown in the screen display 2224, the child has to help the rabbit add and subtract blocks 2226. The child stacks the blocks in the spaces on the desk 2200 as the rabbit stacks them on the screen. The rabbit directs the child as to how many to add and how many to subtract.

Other rooms will have more "hands on" activities, such as, puzzles, art, music and story construction. Additional software titles and characters provide further adventures and learning activities.

This plaything also is a multi-activity standalone toy. The top of the desk and the toy rabbit are detachable. The child can use the blocks on the desk top to build sentences, make words, count, build towers, etc. The clothes encourage role playing. The toy rabbit has built-in audio so the child can listen to songs or answer questions the rabbit asks about the story.

This plaything provides a family environment for make-believe play, creates play experiences with an imaginary friend, and encourages manipulative play. It provides an adventure story that reinforces numerous learning concepts and skills, such as number recognition, counting and simple math operations, problem-solving, vocabulary building, story construction, rhyming, following directions, listening and speaking skills, visual discrimination, shape, letter and color recognition, and exploratory learning.

Three Ring Circus Family Games

Figure 23:
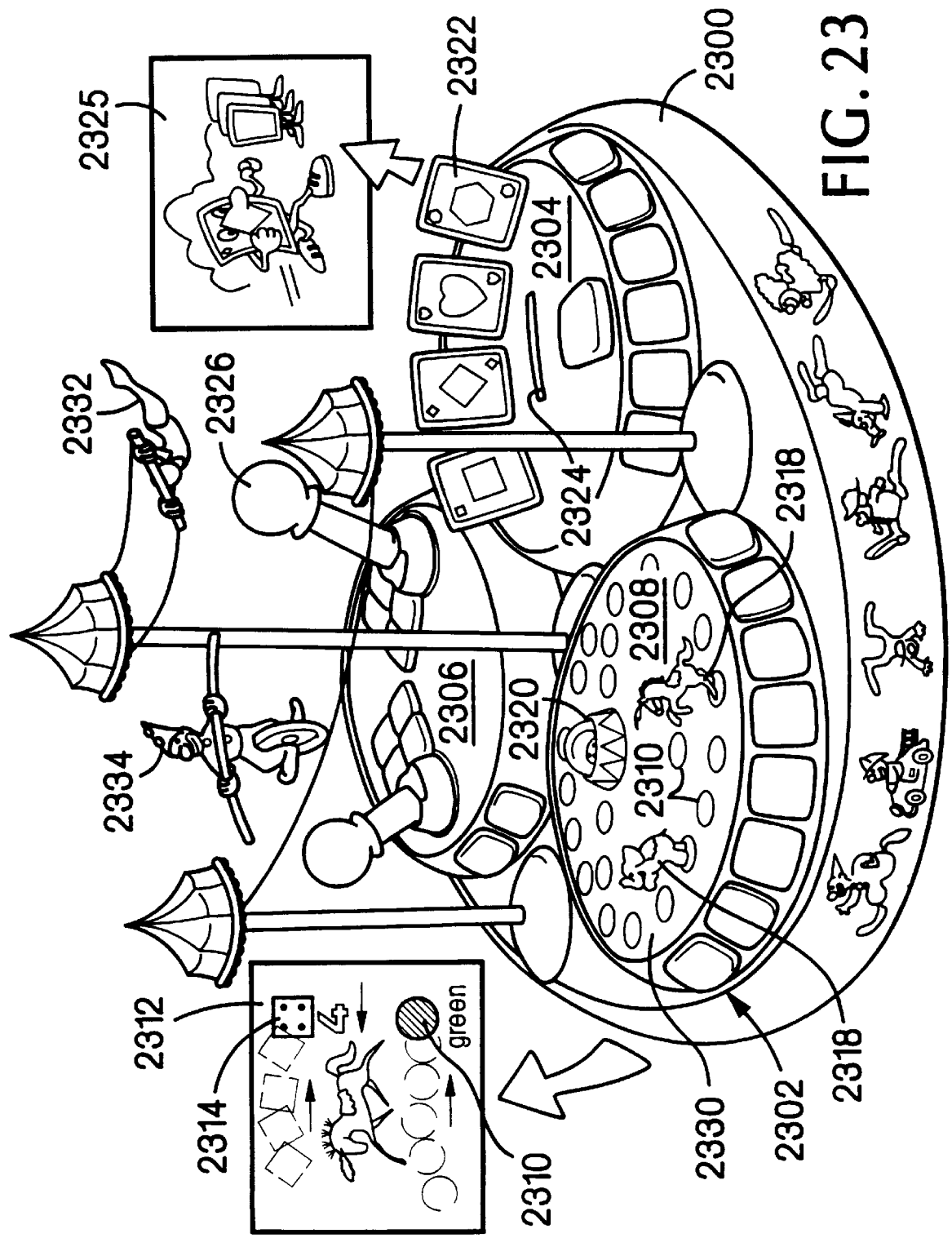
FIG. 23 is a perspective view of a circus plaything and two sample computer displays.

In FIG. 23 the plaything simulates a three ring circus. The plaything has a base 2300 with three game rings 2302, 2304, 2306 mounted on it, collectively called Three Ring Circus Family Games. The Three Ring Circus Family Games are three different types of games presented in a circus motif. The child can play the games individually or with other children or family members.

The computer software acts as the "ringmaster," providing the instructions and controlling the turns for the games. When the child plays individually, the computer also serves as the other player.

The board game 2302 has a flat game board 2308 with token spaces 2310 arranged in a path. Using a screen display such as screen 2312, the software shows the throw of the dice 2314 and the player for that turn 2316. The player moves a game token 2318 forward as many places as the number on the die. Some of the token spaces on the board make different sounds when a game token lands on them. Certain places on the board that have penalties whereas others have bonuses; the computer program provides silly animations for both types of spaces. The software shows on the screen each move that is made and provides help if needed. The object of the game is to move a player token to the circus stand 2320 in the middle of the ring of the board game first. The winner is greeted by a large crowd on the screen cheering and throwing things in the air. The board game has snap on covers so other games can be played.

In the card game ring 2304, there are different sets of cards 2322 to play different card games. For example, there are cards with a noun or verb and a corresponding picture on them. The child hears the word on the card by inserting the card in the slot 2324. The objective of the game is to construct sentences based on the cards each player is dealt. The completed sentence animates on the screen, as shown in the sample display 2325. The fun part of the game is to create silly sentences and see the animation.

Another set of cards has phrases and pictures on them that make up a story. The players listen to the phrase and then decide if one of their cards is the next logical part of the story. An example is: Phrase #1 "There once was a cat . . . " The player who had the card that said "that lived in a tree." would put in that card to complete the sentence. Other card games can be fish or matching colors and shapes.

The third game platform 2306 is set up for two players with two joysticks 2326. The game requires observation and speed. For example, the screen shows a circus scene and the players have to complete an action by a preset time, e.g., getting the trapeze artists to the other side in time before falling into the net.

Two of the games within the Three Ring Circus can be used without a computer. The board game 2308 comes with a set of dice (not shown in FIG. 23), board pieces 2318 and different snap on covers 2330. The cards 2322 in the card game are active so that when the player inserts a card into the slot 2324, the player hears the word or phrase. The toy circus characters 2332, 2334 (e.g. trapeze artists 2332 and clowns 2334) can be used as dolls for fantasy play.

This plaything provides story telling experiences and fantasy play; fosters collaborative play; and promotes manipulative play. It stimulates thinking and learning, and teaches game strategy; listening, following directions and self control (taking turns); fine motor skill development; vocabulary, sentence and story construction; observation; and collaboration and cooperation.

Walkin' Talkin' Rockin' Horse

In FIG. 24 the plaything simulates a horse. The plaything is a rocking horse 2400, sized to fit a real child, and equipped with saddle bags 2402, a saddle 2404 with a joystick control located where a real saddle has a saddle horn, reins 2406 for moving the horse in different directions and a keyboard 2408 in the neck of the horse 2410 to navigate through software running on the computer. The movement of the horse in the software corresponds to the movement of the child on the rocking horse.

The software takes the child to different environments involving horses. Each software program displays a main character home (usually older and wiser) who befriends the child and rocking horse. The rocking horse's counterpart on the screen is a wise cracking, joke telling character.

One software program provides a city scene. The child encounters a policeman and his horse. The police horse talks to the child and the rocking horse as they saunter around the city. The police horse tells the child what he does and what it's like being in a city with congestion and pollution. The horse shows the child how to help clean up the environment through recycling and the child has to pick up recyclable objects (plastic, glass, newspapers, aluminum cans) to take to the recycling center. Different silly creates would "pop up" as the child picks up the objects.

Another program involves the child in a national park such as Yosemite or Yellowstone. The child is walking the horse along with the park ranger, as shown in sample display 2420. The child navigates the horse through a maze of mountains, rivers and waterfalls. The park ranger points out different animals and plants that live and grow in the park.

In other games the child picks out the animals and plants the child saw in the park. In another program the child joins cattle rustlers rounding up stray cattle.

Yet another program provides a horse race. The child and the horse 2400 participate in the horse race with other horses. The speed with which the child rocks the horse 2400 determines how fast a corresponding horse moves on a screen display such as the sample display 2430 in FIG. 24. The horses go around the track a specified number of times to win the race.

Without the computer, the horse 2400 can be used for separate fantasy play like any non-electronic rocking horse. This plaything uses physical activity for play; provides an imaginary companion or friend; and creates a make-believe play environment. The integration of movement into the learning activities is unique to this plaything. The plaything teaches children kinesthetic learning; fine and gross motor skill development; spatial relations and problem-solving; characteristics of different plants and animals; counting; directions; classification; storytelling; memory skill development; and vocabulary.

Story Telling Puzzles

Figure 25:
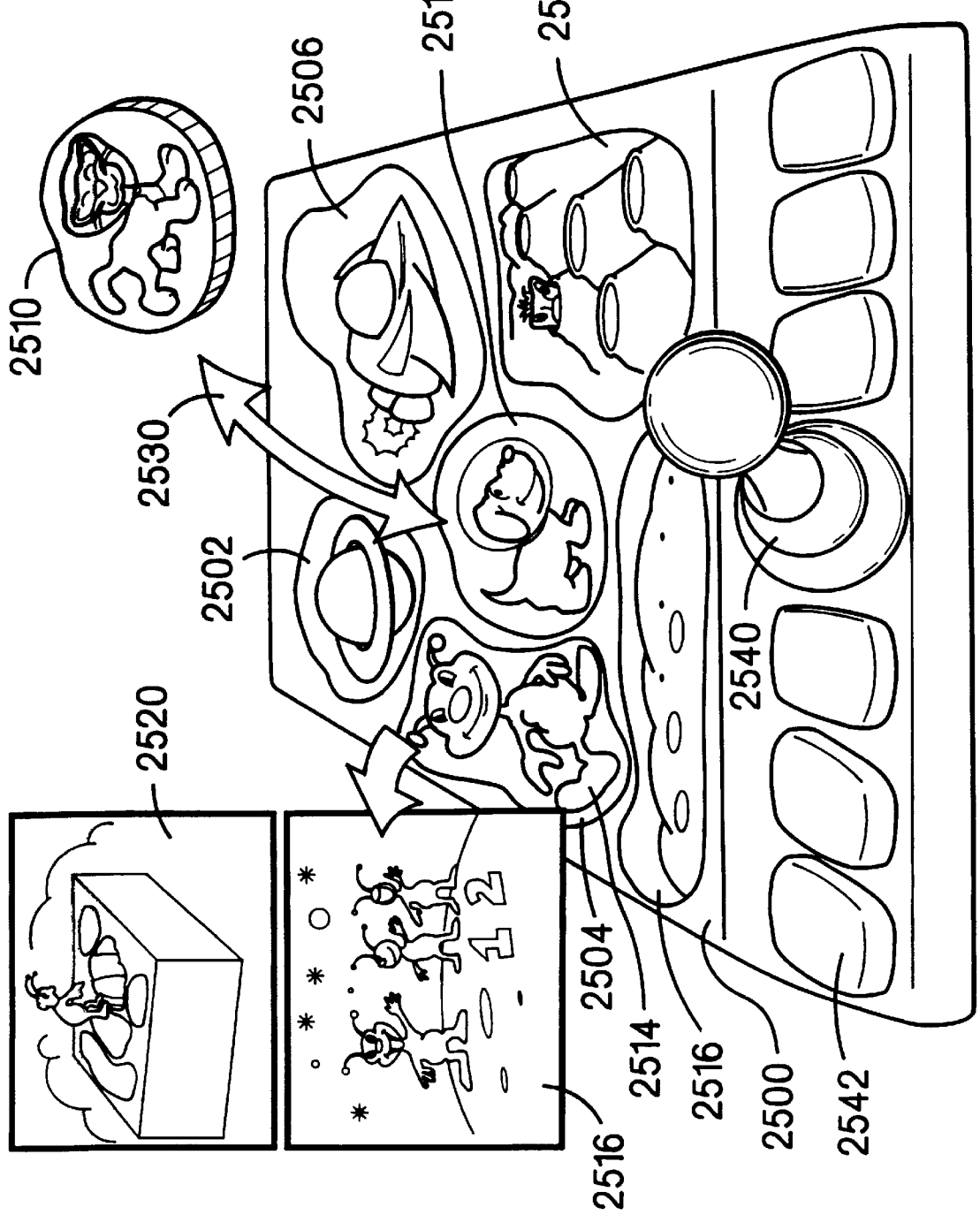
FIG. 25 is a perspective view of a puzzle plaything and two sample computer screen displays.

In FIG. 25 the plaything is a puzzle base 2500 which can be used with a computer to provide a set of play activities called Story Telling Puzzles. The base 2500 includes interchangeable pieces 2502–2512 that tell a story. Each puzzle piece is active and the story changes depending upon the combination of puzzle pieces. The story comes alive through software.

The pieces 2502–2512 that fit to complete the puzzle represent "who, what and where" in order to provide a coherent story which interacts with the child.

When the child puts a piece in, that part of the story will activate on the screen. As an example, the child puts in piece 2504 which has a picture 2514 of a friendly space creature. That creature appears on the CRT 14 and tells the child who he is and what he is doing on the planet in outer space, as shown in exemplary display 2516.

The base 2500 also has a joystick control 2540 to enable the child to remotely control the cursor on the computer screen. The base has pushbuttons 2542 which duplicate keys on a standard computer keyboard. Using the buttons, a child can select features offered by the software or respond to queries from the software.

The software operates in at least three modes which the child can select. First, the software provides a reaching mode which guides the child in selecting the correct piece. For example, the characters on the screen suggest who should join them next, as shown in the sample screen display 2520. They point to an empty space and provide ideas about what piece would fit in there—the dog/cat piece. In response, the child places the appropriate piece in an empty space in the base, such as space 2516.

Second, there is a rhyme mode in which each piece says a rhyme. A third mode is a story mode, by which each piece tells something about itself and asks the child to join them in a learning, creative or fun activity when the child puts it in place. When the child has completed the puzzle, the story is told and animated. To make the story interactive, as the characters animate through the story, they suggest that the child explore things on the screen with the cursor. Once selected, the objects animate. For example, some of the characters search for something and ask the child to help, e.g., when coming to a door, "Should we go in?"

For each spot in the puzzle, a variety of removable pieces 2502–2512 will fit, allowing diverse combinations of stories and experiences. For example, as shown by arrow 2530, both a cat piece 2510 and a dog piece 2512 will fit in the same space.

Additional software is accompanied by new puzzle pieces that tell new stories.

This plaything also provides a standalone toy in the form of a puzzle a child puts together about a story the child creates. Each piece can also "speak" and tell the child what it is and/or ask the child to do something, e.g., "Show me the piece with the space dog" or "Show me the square piece." The plaything provides a story telling experience; fosters manipulative play; and encourages creative expression. It also addresses specific learning concepts and skills, such as spacial relations and problem-solving; listening skills, memory skills by re-telling stories; exploratory learning; vocabulary and rhymes; and sentence and story construction.

Medical Kit

Figure 26:
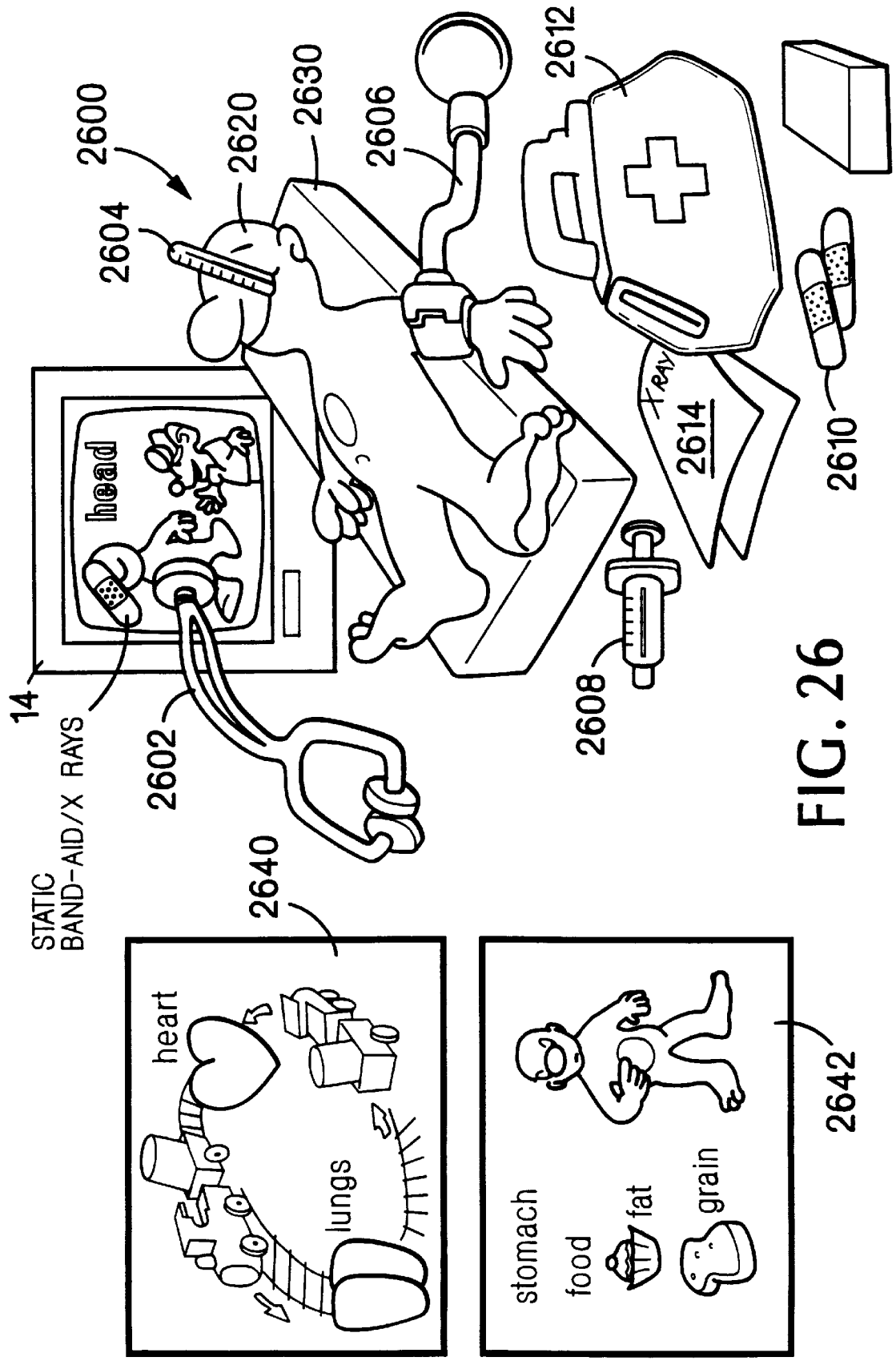
FIG. 26 is a perspective view of a medical kit plaything and two sample computer screen displays.

In FIG. 26 the plaything is a kit 2600 with medical instruments such as a stethoscope 2602, thermometer 2604, blood pressure cuff 2606, a syringe 2608, bandages 2610, a doctor's bag 2612, and patient chart sheets 2614. The kit also includes a play "patient" 2620 and stretcher 2630.

The purpose of this kit and related software is to assist the child in learning how the body and its systems work. One computer program used with the kit illustrates on the screen 14 what is happening with the "patient" as the child examines him. The "patient" has electronic sensors so the computer can respond to what the child is doing. The patient has clips to clip on electronic bandages. On the screen, the child sees the body part where the bandage is and learns the names of the different parts.

The software also presents different body parts by showing "x-rays" of different bones, e.g., an x-ray of the bones in the leg.

The toy medical instruments are used to illustrate graphically on the screen the different functions of the body. The child can hear and see the heart beat when the child uses the stethoscope; the child can hear, see and count the pulse; watch the blood pressure gauge; and see the patient's throat and teeth. A character on the screen asks the child to touch the patient's forehead and then a picture of the brain appears. The screen shows a group of busy telephone operators with head sets receiving and translating code and sending out messages to the body through the nervous system. The child sees that when the child is bitten by a mosquito, the nerves act as a messenger to the brain which tells the child the arm itches. The child leans how the nervous system communicates back and forth between the brain and different parts of the body.

There are activities on the five senses. For vision, there are optical illusions, e.g., the picture of the vase and two profiles. The child sees flowers in the vase which animates; then it fades into the background; the two faces then animate and start talking.

To explain the sense of hearing, the characters on the screen say "Peter" with their hands in front of their mouths, which the child imitates. On the screen the child sees the air from their mouths move and animate. The children feel the air from their mouths. This leads to an explanation of air movement being translated in the ear as sound exemplified by curtains blowing in the wind.

There are similar activities for the other three senses.

Other software activities will focus on other systems of the body. As shown in exemplary screen display 2640, one activity uses a train metaphor to explain how blood is carried to and from the heart. Another activity show the digestive system and the importance of nutrition, as shown in exemplary screen display 2642. For example, the computer shows the body as a furnace and food as fuel. If too much fuel is put into the body, the furnace can't burn efficiently and gets fat.

The medical kit enables the child to play doctor by experimenting with the stethoscope, blood pressure cuff, syringe, bandages and other medical paraphernalia. The kit provides a way for the child to imitate adult roles. The kit also provides a vehicle for dramatic play; enables the child to try out "real life" situations; and encourages affective responses.

The medical kit offers several important learning experiences for the child, such as hypothesis testing and problem-solving; understanding of how the body functions and its systems; increased vocabulary; names of body party; development of empathy; and preventive health concepts.

Mike The Mike

Figure 4:
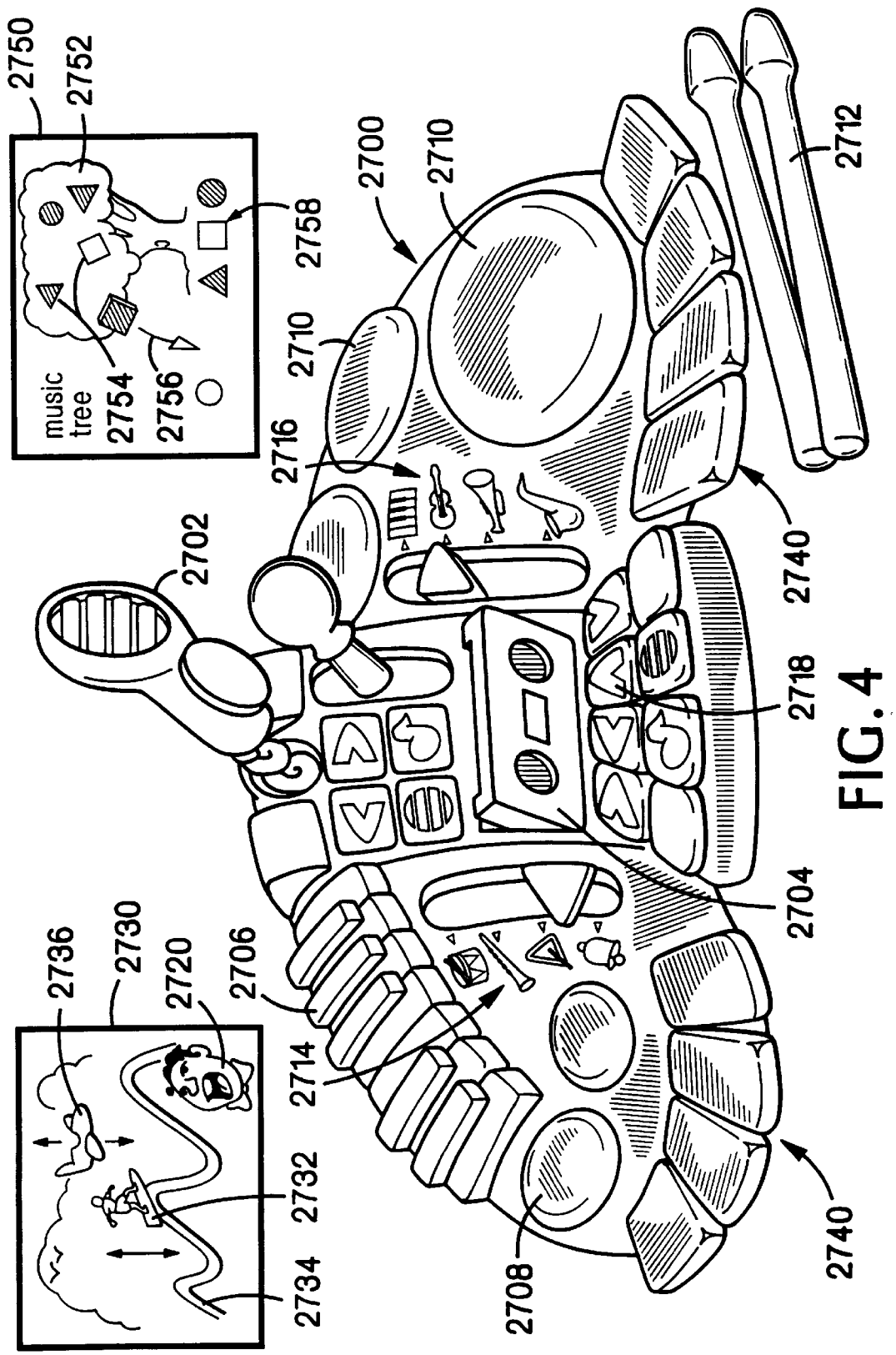
FIG. 4 is a perspective view of a plaything with microphone and musical instrument elements.

In FIG. 4 the plaything is a musical center 2700 called "Mike the mike" with a microphone 2702, an audiotape player 2704, piano keys 2706, cymbals 2708, drums 2710, drum sticks 2712, indicators for different musical instrument sounds 2714, 2716, volume, bass, treble, sound distortion controls, and forward, back, up and down keys 2718 for moving the cursor on the screen 14.

The musical center includes software to display a microphone character 2720 on the screen 14 as shown in sample display 2730. The musical center allows children to play along with any audio compact disk (CD) on the computer.

The musical center and software provides "kids karaoke"—sing and play along to musical software titles on CD. The special titles also feature animated characters and activities.

The musical center works with any audio CD inserted into a CD ROM drive coupled to the computer 8. A special keyboard 2740 allows the child to play any selection of songs from the CD with a visual "song picker", and also see entertaining visual displays. A variety of fun and learning activities are provided in the software.

For example, one of the software activities is a graphical illustration of the changes in the child's voice pitch. As shown in the sample screen display 2730, the CRT screen 14 shows a surfer 2732 riding sound waves 2734 that go higher as the child's voice pitch (received by the computer through the microphone 2702) goes higher. The child tries to make the wave high enough to touch the airplane 2736 on the screen. To assist the child, a character 2720 in the bottom of the screen demonstrates voice pitch.

A second activity is an auditory/visual association and memory game. On the screen 14, as shown in the sample screen display 2750, is a musical tree 2752 with different colored shapes 2754. Each shape is associated with the sound of a different musical instrument. When the child "plays" the instrument, the shape lights up on the screen then falls off the tree to the bottom of the screen, as shown by arrow 2756. After a certain number of shapes have fallen, as indicated by reference numeral 2758, a musical pattern forms. The instructions associated with the pattern play; then the child replays the pattern.

Using another computer program, the child can experience with voice recordings. For example, the child can play a recording backwards or hear what the child's voice sounds like distorted, and see it illustrated graphically on the screen.

Without a computer, the musical center works as the child's musical studio. Many of the activities associated with the software can be done without the software. For example, children enjoy hearing their voice distorted or played backwards. The karaoke activity is an excellent group or individual musical activity. The child can experiment with sounds of different musical instruments or compose melodies.

Both with and without a computer, the musical center fosters creative expression and creative play, provides a multisensory play environment with a focus on auditory learning, and encourages collaborative play. It also taps children's creativity and musical skills. Children learn how to create different musical patterns and songs; sequencing; experimentation and improvisation; different musical instruments and sounds; memory skills; colors, shapes, and sound recognition; voice pitch and harmony, voice as sound waves; and music selection and control.

Other embodiments are within the scope of the following claims.

What is claimed is:

1. Interactive apparatus for use with a computer, comprising a transceiver for two-way communication with a plaything that is configured as a fantasy representation of a corresponding utilitarian object, a control device for causing the computer to send and receive information to and from the plaything via the transceiver, and a fantasy play program that is stored and executable at the plaything and that uses the received information to enable the plaything to provide interactive fantasy simulation of the behavior of the corresponding utilitarian object.

2. The apparatus of claim 1 wherein the control device comprises computer instructions.

3. The apparatus of claim 1 wherein the transceiver comprises a connector for attachment to a communications port of the computer.

4. Interactive apparatus for use with a computer, comprising a transmitter for communication to a plaything that is configured as a fantasy representation of a corresponding utilitarian object, a control device for retrieving from the computer and sending, via the transmitter to the plaything, synthesized voiced utterances, and a fantasy play program that is stored and executable at the plaything and that cooperates with the transmitter to enable playback of the synthesized voiced utterances at the plaything.

5. Interactive apparatus for use with a computer, comprising a receiver for reception of information transmitted from a plaything that is configured as a fantasy representation of a corresponding utilitarian object, the plaything having a locally stored and locally executable fantasy play program that cooperates with the receiver to generate the transmitted information, and a control device for controlling the performance of multimedia material on the computer in response to the information received from the plaything.

6. A plaything comprising visual and tactile elements that simulate a utilitarian object and impart a fantastic aura to the plaything to enable fantasy play, where the visual and tactile elements comprise elements of a driver simulator, an input device for receiving input from a user of the plaything, a locally stored and locally executable fantasy play program, an output device that cooperates with the fantasy play program to provide controlled output to the user to aid in the fantasy play, and a transceiver connected to the input and output devices and to the visual and tactile elements, for two-way communication with a computer.

7. The apparatus of claim 1, 4, 5, or 6 further comprising a touch sensitive input surface for receiving touch input from a user of the plaything.

8. The apparatus of claim 1, 5, or 6 further comprising a speaker and a voice synthesizer coupled to the plaything which cooperate with the fantasy play program to deliver synthesized voiced utterances at the plaything.

9. Interactive apparatus comprising a computer, a plaything that is configured as a fantasy representation of a corresponding utilitarian object, a transceiver coupled to the plaything for two-way communication with the plaything, a control device coupled to the computer for causing the computer to send and receive information to and from the plaything via the transceiver, and a fantasy play program that is stored and executable at the plaything and that uses the received information to enable the plaything to provide interactive fantasy simulation of the behavior of the corresponding utilitarian object.

10. The apparatus of claim 9 wherein the control device comprises computer instructions.

11. The apparatus of claim 9 wherein the transceiver comprises a connector for attachment to a communications port of the computer.

12. The apparatus recited in claim 1, 4, 5, 6, or 9 wherein the plaything further comprises a computer data input device.

13. The apparatus of claim 1, 4, 5, 6, or 9 wherein the communication is wireless.

* * * * *